US011940742B2

(12) United States Patent
Sueyasu et al.

(10) Patent No.: US 11,940,742 B2
(45) Date of Patent: Mar. 26, 2024

(54) IMAGE FORMING APPARATUS HAVING THREE TERMINALS ELECTRICALLY CONNECTABLE WITH DETACHABLE CARTRIDGE

(71) Applicant: BROTHER KOGYO KABUSHIKI KAISHA, Nagoya (JP)

(72) Inventors: Masato Sueyasu, Nagoya (JP); Yoshiyuki Tsujimoto, Nagoya (JP); Takuya Nagai, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/822,568

(22) Filed: Aug. 26, 2022

(65) Prior Publication Data

US 2022/0404736 A1 Dec. 22, 2022

Related U.S. Application Data

(63) Continuation of application No. PCT/JP2020/025220, filed on Jun. 26, 2020.

(30) Foreign Application Priority Data

Feb. 28, 2020 (JP) ................................ 2020-033574

(51) Int. Cl.
*G03G 21/00* (2006.01)
*G03G 15/08* (2006.01)
*G03G 21/16* (2006.01)

(52) U.S. Cl.
CPC ..... *G03G 15/0863* (2013.01); *G03G 21/1652* (2013.01); *G03G 21/1676* (2013.01)

(58) Field of Classification Search
CPC ........... G03G 15/0863; G03G 21/1652; G03G 21/1676

(Continued)

(56) References Cited

U.S. PATENT DOCUMENTS

2017/0219997 A1 8/2017 Kim
2019/0079425 A1 3/2019 Lin
(Continued)

FOREIGN PATENT DOCUMENTS

CN 109976125 A 7/2019
CN 110412852 A 11/2019
(Continued)

OTHER PUBLICATIONS

International Search Report issued in corresponding International Patent Application No. PCT/JP2020/025220, dated Oct. 13, 2020.
(Continued)

*Primary Examiner* — Quana Grainger
(74) *Attorney, Agent, or Firm* — Merchant & Gould P.C.

(57) ABSTRACT

An image forming apparatus to which a cartridge including a cartridge substrate is attachable includes a main body electrical substrate, a main body ground terminal connected to the main body electrical substrate and configured to take a ground voltage, a first main body terminal connected to the main body electrical substrate and configured to transmit one of a power supply voltage, a data signal that indicates information, and a synchronization signal, a second main body terminal connected to the main body electrical substrate and configured to transmit remaining two of the power supply voltage, the data signal, and the synchronization signal.

The cartridge substrate includes a cartridge ground terminal connected to the main body ground terminal, a first cartridge terminal connected to the first main body terminal, and a second cartridge terminal connected to the second main body terminal.

20 Claims, 10 Drawing Sheets

(58) Field of Classification Search
USPC ........................................................ 399/13
See application file for complete search history.

(56) References Cited

U.S. PATENT DOCUMENTS

| | | | |
|---|---|---|---|
| 2019/0196361 | A1 | 6/2019 | Kyotani |
| 2019/0196394 | A1 | 6/2019 | Yabuki et al. |
| 2021/0325813 | A1 | 10/2021 | Zhang et al. |

FOREIGN PATENT DOCUMENTS

| | | | |
|---|---|---|---|
| JP | 2001-337579 | A | 12/2001 |
| JP | 2003-323098 | A | 11/2003 |
| JP | 2013-208782 | A | 10/2013 |
| JP | 2013-218199 | A | 10/2013 |
| JP | 2019-117346 | A | 7/2019 |
| WO | 2013/147318 | A1 | 10/2013 |

OTHER PUBLICATIONS

Translation of Notification Concerning Transmittal of International Preliminary Report on Patentability dated Sep. 9, 2022, Written Opinion dated Oct. 13, 2022, International Preliminary Report on Patentability dated Aug. 30, 2022 in corresponding International Patent Application No. PCT/JP2020/025220.

IMAGE FORMING APPARATUS HAVING THREE TERMINALS ELECTRICALLY CONNECTABLE WITH DETACHABLE CARTRIDGE

REFERENCE TO RELATED APPLICATIONS

This is a continuation application of International Application No. PCT/JP2020/025220 filed on Jun. 26, 2020 which claims priority from Japanese Patent Application No. 2020-033574 filed on Feb. 28, 2020. The entire contents of the earlier applications are incorporated herein by reference.

BACKGROUND ART

In the related art, an electrophotographic image forming apparatus such as a laser printer or an LED printer has been known. The image forming apparatus includes a drum cartridge and a toner cartridge. The drum cartridge includes a photosensitive drum. The toner cartridge includes a developing roller. The toner cartridge is attachable to and detachable from the drum cartridge. When the toner cartridge is attached to the drum cartridge, the developing roller of the toner cartridge is in contact with the photosensitive drum of the drum cartridge.

In the related art, there has been known that in the image forming apparatus in the related art, a memory is mounted in one or both of the toner cartridge and the drum cartridge.

DESCRIPTION

In such an image forming apparatus, it is necessary to perform (1) taking of a ground voltage, (2) transmitting of a power supply voltage, (3) transmitting of a data signal, and (4) transmitting of a synchronization signal between a substrate included in a main body of the image forming apparatus and the memory included in the cartridge. Therefore, in order to realize (1) to (4), four parallel terminals are usually required. However, in order to reduce sizes of an image forming apparatus and a cartridge, the number of terminals is required to be reduced.

An object of the present disclosure is to provide a technique capable of reducing the number of terminals that electrically connect a substrate included in a main body of an image forming apparatus with a memory included in a cartridge.

A first aspect of disclosure is an image forming apparatus to which a cartridge that includes a cartridge substrate including a memory is attachable, the image forming apparatus including a main body electrical substrate, a main body ground terminal electrically connected to the main body electrical substrate, the main body ground terminal being configured to take a ground voltage, a first main body terminal electrically connected to the main body electrical substrate, the first main body terminal being configured to transmit one of a power supply voltage higher than the ground voltage, a data signal that indicates information written into the memory or read out from the memory, and a synchronization signal taking a timing of the data signal, a second main body terminal electrically connected to the main body electrical substrate, the second main body terminal being configured to transmit remaining two of the power supply voltage, the data signal, and the synchronization signal, and a main body frame to which the cartridge is attachable. The cartridge substrate includes a cartridge ground terminal electrically connected to the main body ground terminal in a state where the cartridge is attached to the main body frame a first cartridge terminal electrically connected to the first main body terminal in the state, and a second cartridge terminal electrically connected to the second main body terminal in the state.

A second aspect of disclosure is the image forming apparatus according to the first aspect of disclosure. The memory includes a timer configured to generate a clock signal. The synchronization signal is a reset signal for resetting the timer.

A third aspect of disclosure is the image forming apparatus according to the first aspect of disclosure. The synchronization signal is a clock signal.

A fourth aspect of disclosure is the image forming apparatus according to the first aspect of disclosure. The first main body terminal is configured to transmit the power supply voltage. The second main body terminal is configured to transmit the data signal and the synchronization signal.

A fifth. aspect of disclosure is the image forming apparatus according to the fourth aspect of disclosure. The cartridge substrate further includes a cartridge pull-up resistor including one end connected to the first cartridge terminal and the other end connected to the second cartridge terminal.

A sixth aspect of disclosure is the image forming apparatus according to the fourth aspect of disclosure. The main body electrical substrate includes a main body pull-up resistor including one end connected to the first main body terminal and the other end connected to the second main body terminal.

A seventh aspect of disclosure is the image forming apparatus according to the fourth aspect of disclosure. The main body electrical substrate includes a switch configured to switch between supply and stop of the power supply voltage to the first main body terminal and a processor configured to control the switch.

An eighth aspect of disclosure is the image forming apparatus according to the seventh aspect of disclosure. The main body electrical substrate further includes a main body pull-down resistor that includes one end connected to the first main body terminal and the other end connected to the main body ground terminal.

A ninth aspect of disclosure is the image forming apparatus according to the fourth aspect of disclosure. The memory is configured to be driven by obtaining a voltage from a signal supplied from the second cartridge terminal.

A tenth aspect of disclosure is the image forming apparatus according to the first aspect of disclosure. The first main body terminal is configured to transmit a clock signal being the synchronization signal. The second main body terminal is configured to transmit the data signal.

An eleventh aspect of disclosure is the image forming apparatus according to the tenth aspect of disclosure. The memory is configured to be driven by obtaining a voltage from a signal supplied from the first cartridge terminal or the second cartridge terminal.

A twelfth aspect of disclosure is the image forming apparatus according to the first aspect of disclosure. The cartridge includes a toner cartridge including atoner substrate being the cartridge substrate and a drum cartridge including a photosensitive drum, the drum cartridge including a drum substrate being the cartridge substrate. The drum substrate is electrically connected to the main body electrical substrate through the toner substrate.

A thirteenth aspect of disclosure is the image forming apparatus according to the twelfth aspect of disclosure. The toner cartridge includes a developing roller.

A fourteenth aspect of disclosure is the image forming apparatus according to the first aspect of disclosure. The main body electrical substrate includes a main substrate including a processor and a relay substrate configured to relay connection between the main substrate and the cartridge substrate.

A fifteenth aspect of disclosure is the image forming apparatus according to the first aspect of disclosure. The memory is configured to store the information used by the image forming apparatus.

A sixteenth aspect of disclosure is the image forming apparatus according to the fifteenth aspect of disclosure. The information includes at least one of identification information and lifetime information of the cartridge. The main body electrical substrate is configured to read out the information as the data signal from the memory, and to store the information in a main body memory mounted on the main body electrical substrate.

According to first to sixteenth aspects of the disclosure, it is possible to realize, by three parallel terminals, (1) taking of the ground voltage, (2) transmitting of the power supply voltage, (3) transmitting of the data signal, and (4) transmitting of the synchronization signal between the main body electrical substrate and the cartridge substrate. As a result, the number of terminals can be reduced as compared with a case where (1) to (4) are realized by four parallel terminals.

According to a fifth aspect of the disclosure, in the cartridge substrate, the data signal and the synchronization signal are less likely to be influenced by noise. As a result, even when a wiring between the main body electrical substrate and the cartridge substrate is long, the data signal and the synchronization signal can be stably transmitted.

According to a sixth aspect of the disclosure, in the main body electrical substrate, the data signal and the synchronization signal are less likely to be influenced by noise. As a result, even when a wiring between the main body electrical substrate and the cartridge substrate is long, the data signal and the synchronization signal can be stably transmitted.

According to a seventh aspect of the disclosure, power consumption can be reduced by turning off a switch when the power supply voltage is unnecessary.

According to an eighth aspect of the disclosure, static electricity entering a first main body terminal can be released to ground through a main body pull-down resistor.

Hereinafter, embodiments of the present disclosure will be described with reference to drawings.

1. First Embodiment

<1-1. With regard to Configuration of Image Forming Apparatus>

Figure 1:
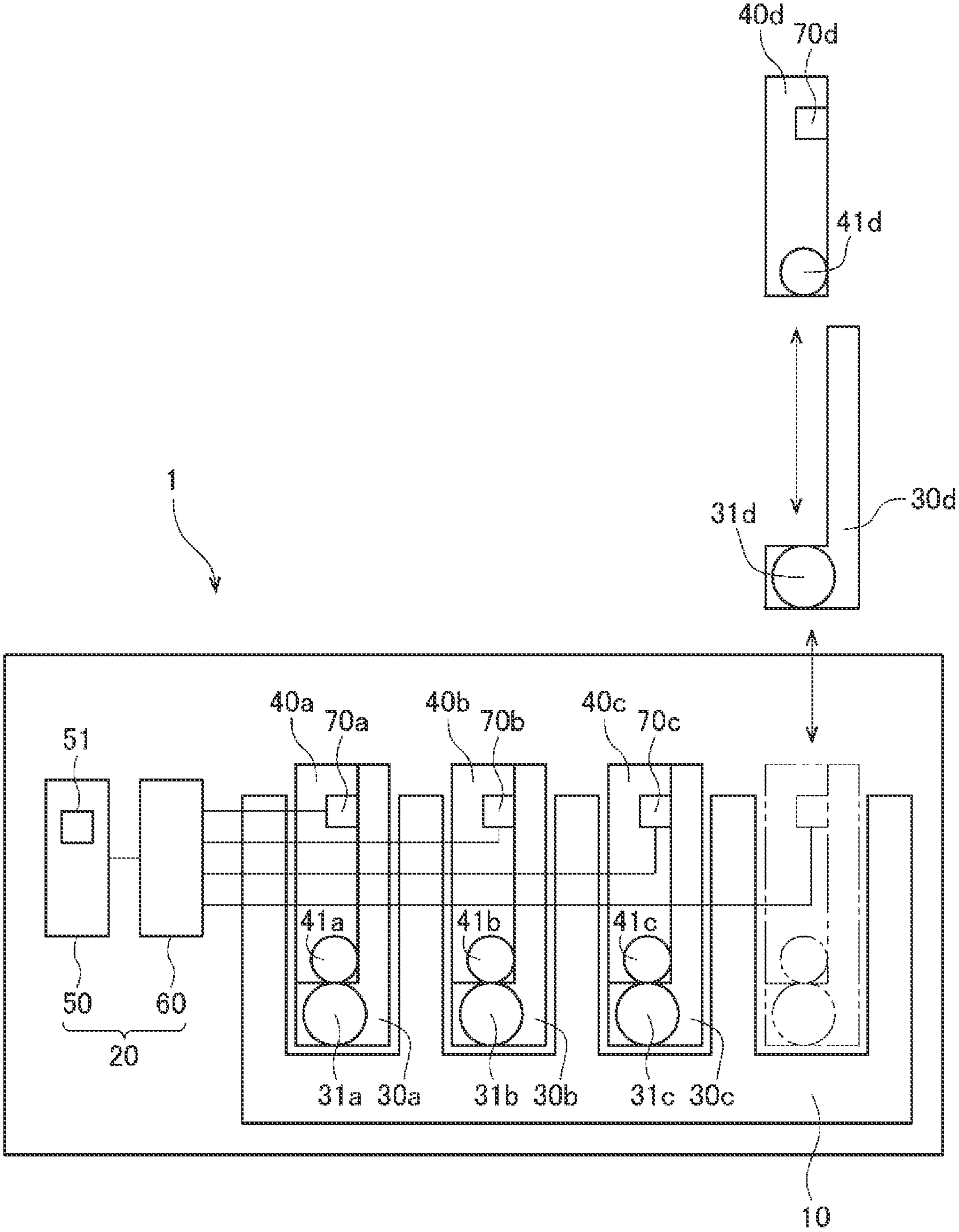
FIG. 1 is a conceptual diagram of an image forming apparatus.

FIG. 1 is a conceptual diagram of an image forming apparatus 1 according to a first embodiment. The image forming apparatus 1 is an electrophotographic printer. Examples of the image forming apparatus 1 include a laser printer or an LED printer. As shown in FIG. 1, the image forming apparatus 1 includes a main body frame 10, a main body electrical substrate 20, four drum cartridges 30*a*, 30*b*, 30*c*, and 30*d*, and four toner cartridges 40*a*, 40*b*, 40*c*, and 40*d*.

The main body electrical substrate 20 includes a main substrate 50 and a relay substrate 60. The main substrate 50 is a plate-shaped electric circuit board. The main substrate 50 includes a processor 51. The processor 51 may be a CPU or an MPU, or may be an application specific integrated circuit (ASIC). The processor 51 operates in accordance with a program, so that the main substrate 50 executes various processes in the image forming apparatus 1. Specifically, the main substrate 50 writes information into each of toner memories 71*a*, 71*b*, 71*c*, and 71*d* to be described later and reads out the information from each of the toner memories 71*a*, 71*b*, 71*c*, and 71*d*. Further, the main substrate 50 causes the image forming apparatus 1 to execute a printing process based on the information read out from each of the toner memories 71*a*, 71*b*, 71*c*, and 71*d*.

The relay substrate 60 is a plate-shaped electric circuit board. The relay substrate 60 relays electrical connection between the main substrate 50 and each of toner substrates 70*a*, 70*b*, 70*c*, and 70*d* to be described later. The main substrate 50 and the relay substrate 60 are electrically connected to each other.

The drum cartridges 30*a*, 30*b*, 30*c*, and 30*d*, and the toner cartridges 40*a*, 40*b*, 40*c*, and 40*d* are each an example of a "cartridge".

The toner cartridge 40*a* can be attached to the drum cartridge 30*a*. The drum cartridge 30*a* to which the toner cartridge 40*a* is attached can be attached to the main body frame 10. The toner cartridge 40*b* can be attached to the drum cartridge 30*b*. The drum cartridge 30*b* to which the toner cartridge 40*b* is attached can be attached to the main body frame 10. The toner cartridge 40*c* can be attached to the drum cartridge 30*c*. The drum cartridge 30*c* to which the toner cartridge 40*c* is attached can be attached to the main body frame 10. The toner cartridge 40*d* can be attached to the drum cartridge 30*d*. The drum cartridge 30*d* to which the toner cartridge 40*d* is attached can be attached to the main body frame 10.

The four toner cartridges 40*a*, 40*b*, 40*c*, and 40*d* store therein toner (developers) of different colors (for example, colors of cyan, magenta, yellow, and black), respectively. The image forming apparatus 1 forms an image on a surface of a print sheet by the toner supplied from the four toner cartridges 40*a*, 40*b*, 40*c*, and 40*d*.

The drum cartridge 30*a* includes a photosensitive drum 31*a*. The drum cartridge 30*b* includes a photosensitive drum 31*b*. The drum cartridge 30*c* includes a photosensitive drum 31*c*. The drum cartridge 30*d* includes a photosensitive drum 31*d*. The photosensitive drums 31*a*, 31*b*, 31*c*, and 31*d* are components that transfer, to the print sheet, the toner supplied from the toner cartridges 40*a*, 40*b*, 40*c*, and 40*d*. The photosensitive drums 31*a*, 31*b*, 31*c*, and 31*d* each include a cylindrical outer circumferential surface. The outer circumferential surfaces of the photosensitive drums 31*a*, 31*b*, 31*c*, and 31*d* are each covered with a photosensitive material. Further, the photosensitive drums 31*a*, 31*b*, 31*c*, 31*d* are each rotatable about a central axis.

The toner cartridge 40*a* includes a developing roller 41*a* and the toner substrate 70*a*. The toner cartridge 40*b* includes a developing roller 41*b* and the toner substrate 70*b*. The toner cartridge 40*c* includes a developing roller 41*c* and the toner substrate 70*c*. The toner cartridge 40*d* includes a developing roller 41*d* and the toner substrate 70*d*.

The developing rollers 41*a*, 41*b*, 41*c*, and 41*d* are rotatable rollers. In a state where the toner cartridge 40*a* is attached to the drum cartridge 30*a*, an outer circumferential surface of the developing roller 41*a* is in contact with the outer circumferential surface of the photosensitive drum 31*a*. In a state where the toner cartridge 40*b* is attached to the drum cartridge 30*b*, an outer circumferential surface of the developing roller 41*b* is in contact with the outer circumferential surface of the photosensitive drum 31*b*. In a state where the toner cartridge 40*c* is attached to the drum cartridge 30*c*, an outer circumferential surface of the developing roller 41*c* is in contact with the outer circumferential surface of the photosensitive drum 31*c*. In a state where the toner cartridge 40*d* is attached to the drum cartridge 30*d*, an outer circumferential surface of the developing roller 41*d* is in contact with the outer circumferential surface of the photosensitive drum 31*d*.

The toner stored in the toner cartridge 40*a* is supplied to the outer circumferential surface of the photosensitive drum 31*a* through the developing roller 41*a*. The toner stored in the toner cartridge 40*b* is supplied to the outer circumferential surface of the photosensitive drum 31*b* through the developing roller 41*b*. The toner stored in the toner cartridge 40*c* is supplied to the outer circumferential surface of the photosensitive drum 31*c* through the developing roller 41*c*. The toner stored in the toner cartridge 40*d* is supplied to the outer circumferential surface of the photosensitive drum 31*d* through the developing roller 41*d*.

The toner substrates 70*a*, 70*b*, 70*c*, and 70*d* are each an example of a "cartridge substrate". The toner substrate 70*a* is located at an outer surface of the toner cartridge 40*a*. The toner substrate 70*b* is located at an outer surface of the toner cartridge 40*b*. The toner substrate 70*c* is located at an outer surface of the toner cartridge 40*c*. The toner substrate 70*d* is located at an outer surface of the toner cartridge 40*d*.

When the drum cartridge 30*a* to which the toner cartridge 40*a* is attached is attached to the main body frame 10, the toner substrate 70*a* is electrically connected to the main body electrical substrate 20. When the drum cartridge 30*b* to which the toner cartridge 40*b* is attached is attached to the main body frame 10, the toner substrate 70*b* is electrically connected to the main body electrical substrate 20. When the drum cartridge 30*c* to which the toner cartridge 40*c* is attached is attached to the main body frame 10, the toner substrate 70*c* is electrically connected to the main body electrical substrate 20. When the drum cartridge 30*d* to which the toner cartridge 40*d* is attached is attached to the main body frame 10, the toner substrate 70*d* is electrically connected to the main body electrical substrate 20.

<1-2. Configuration of Main Body Electrical Substrate>

Figure 2:
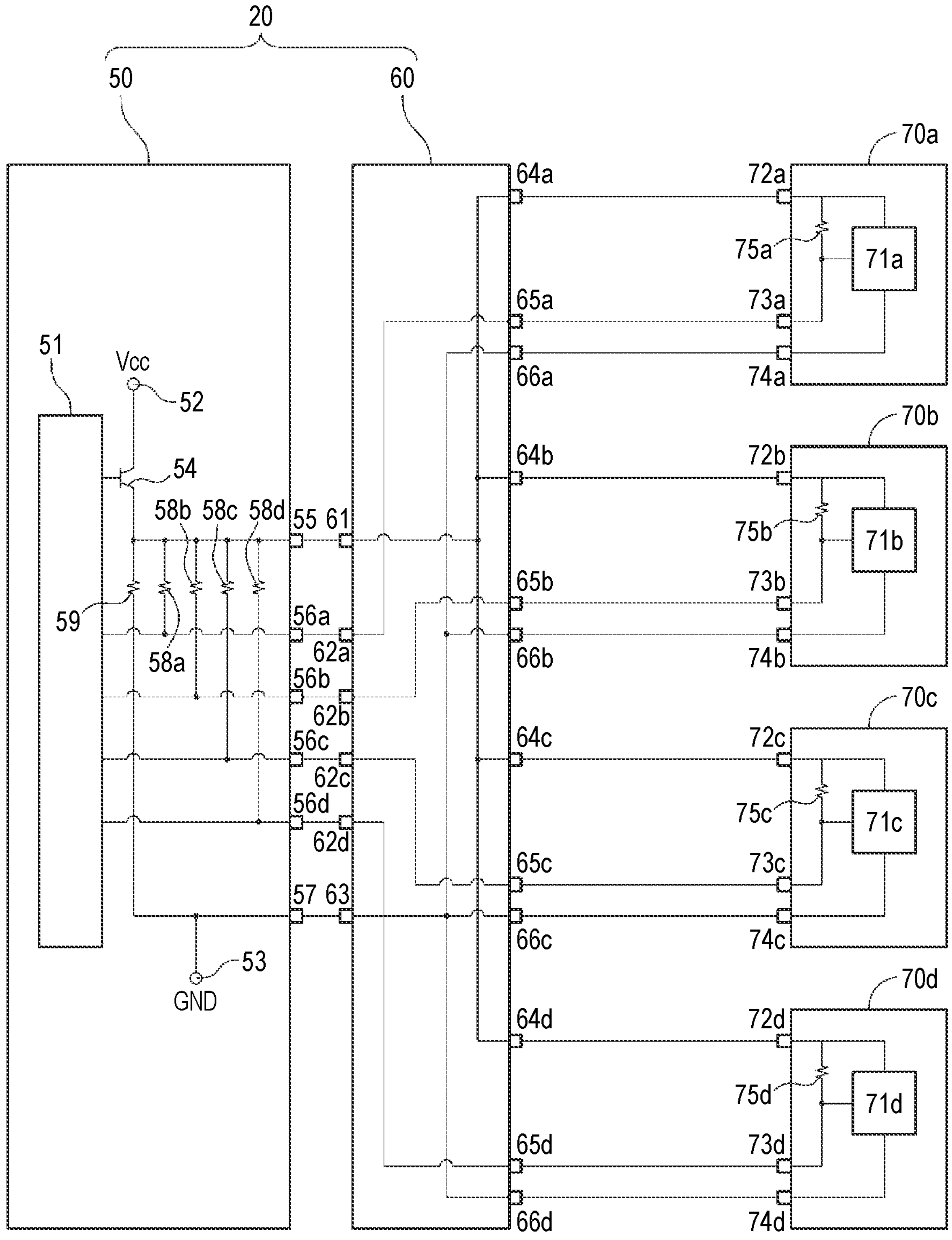
FIG. 2 is a block diagram showing electrical connection between a main body electrical substrate and each of four toner substrates.

FIG. 2 is a block diagram showing electrical connection between the main body electrical substrate 20 and each of the four toner substrates 70*a*, 70*b*, 70*c*, and 70*d*. As described above, the main body electrical substrate 20 includes the main substrate 50 and the relay substrate 60.

As shown in FIG. 2, the main substrate 50 includes the above processor 51, a power supply unit 52, a ground portion 53, a switch 54, a first main terminal 55, four second main terminals 56*a*, 56*b*, 56*c*, and 56*d*, a main ground terminal 57, four main body pull-up resistors 58*a*, 58*b*, 58*c*, and 58*d*, and a main body pull-down resistor 59.

The power supply unit 52 is connected to an external power supply. Therefore, a potential of the power supply unit 52 is a constant power supply voltage. The ground portion 53 is connected to an external ground line. Therefore, a potential of the ground portion 53 is a constant ground voltage. The power supply voltage is higher than the ground voltage.

As the switch 54, for example, a switch element such as a transistor is used. The processor 51 can perform switching from turning off to turning on of the switch 54 and switching from turning on to turning off of the switch 54 by transmitting a switching signal to the switch 54.

The first main terminal 55 is electrically connected to the power supply unit 52 through the switch 54. Therefore, when the switch 54 is turned on, the power supply voltage is supplied from the power supply unit 52 to the first main terminal 55. The four second main terminals 56*a*, 56*b*, 56*c*, and 56*d* are each electrically connected to the processor 51. The main ground terminal 57 is electrically connected to the ground portion 53. Therefore, a potential of the main ground terminal 57 is the ground voltage.

The main body pull-up resistors 58*a*, 58*b*, 58*c*, and 58*d* are electrical resistors. One end of each of the main body pull-up resistors 58*a*, 58*b*, 58*c*, and 58*d* is electrically connected to the first main terminal 55. The other end of the main body pull-up resistor 58*a* is electrically connected to the second main terminal 56*a*. The other end of the main body pull-up resistor 58*b* is electrically connected to the second main terminal 56*b*. The other end of the main body pull-up resistor 58*c* is electrically connected to the second main terminal 56*c*. The other end of the main body pull-up resistor 58*d* is electrically connected to the second main terminal 56*d*.

The main body pull-down resistor 59 is an electrical resistor. One end of the main body pull-down resistor 59 is electrically connected to the first main terminal 55. The other end of the main body pull-down resistor 59 is electrically connected to the main ground terminal 57 and the ground portion 53.

The relay substrate 60 includes a first relay terminal 61, four second relay terminals 62*a*, 62*b*, 62*c*, and 62*d*, a relay ground terminal 63, four first main body terminals 64*a*, 64*b*, 64*c*, and 64*d*, four second main body terminals 65*a*, 65*b*, 65*c*, and 65*d*, and four main body ground terminals 66*a*, 66*b*, 66*c*, and 66*d*.

The first relay terminal 61 is electrically connected to the above first main terminal 55. Further, the four first main body terminals 64*a*, 64*b*, 64*c*, and 64*d* are electrically connected to the first relay terminal 61. Therefore, when the above switch 54 is turned on, the power supply voltage is supplied from the power supply unit 52, through the first main terminal 55 and the first relay terminal 61, to the first main body terminals 64*a*, 64*b*, 64*c*, and 64*d*. That is, the first main body terminals 64*a*, 64*b*, 64*c*, and 64*d* are each a terminal that transmits the power supply voltage.

The second relay terminal 62*a* is electrically connected to the above second main terminal 56*a*. The second relay terminal 62*b* is electrically connected to the above second main terminal 56*b*. The second relay terminal 62*c* is electrically connected to the above second main terminal 56*c*. The second relay terminal 62*d* is electrically connected to the above second main terminal 56*d*.

The second main body terminal 65*a* is electrically connected to the second relay terminal 62*a*. The second main body terminal 65*b* is electrically connected to the second relay terminal 62*b*. The second main body terminal 65*c* is electrically connected to the second relay terminal 62*c*. The second main body terminal 65*d* is electrically connected to the second relay terminal 62*d*.

The processor 51 can transmit a data signal and a synchronization signal to the second main body terminal 65*a* through the second main terminal 56*a* and the second relay terminal 62*a*. The processor 51 can transmit a data signal and a synchronization signal to the second main body terminal 65*b* through the second main terminal 56*b* and the second relay terminal 62*b*. The processor 51 can transmit a data signal and a synchronization signal to the second main body terminal 65*c* through the second main terminal 56*c* and the second relay terminal 62*c*. The processor 51 can transmit a data signal and a synchronization signal to the second main body terminal 65*d* through the second main terminal 56*d* and the second relay terminal 62*d*.

That is, the second main body terminals 65*a*, 65*b*, 65*c*, and 65*d* are each a terminal that transmits the data signal and the synchronization signal. The data signal is a signal that indicates the information written into a respective one of the toner memories 71*a*, 71*b*, 71*c*, and 71*d* to be described later or read out from the respective one of the toner memories 71*a*, 71*b*, 71*c*, and 71*d*. The synchronization signal is a signal taking a timing of the data signal.

The relay ground terminal 63 is electrically connected to the above main ground terminal 57. The four main body ground terminals 66*a*, 66*b*, 66*c*, and 66*d* are electrically connected to the relay ground terminal 63. Therefore, potentials of the four main body ground terminals 66*a*, 66*b*, 66*c*, and 66*d* are each the ground voltage. That is, the four main body ground terminals 66*a*, 66*b*, 66*c*, and 66*d* are each a terminal that takes the ground voltage.

<1-3. Configurations of Toner Substrates>

The toner substrate 70*a* includes the toner memory 71*a*. The toner memory 71*a* is a storage medium that stores information related to the toner cartridge 40*a*. The toner substrate 70*b* includes the toner memory 71*b*. The toner memory 71*b* is a storage medium that stores information related to the toner cartridge 40*b*. The toner substrate 70*c* includes the toner memory 71*c*. The toner memory 71*c* is a storage medium that stores information related to the toner cartridge 40*c*. The toner substrate 70*d* includes the toner memory 71*d*. The toner memory 71*d* is a storage medium that stores information related to the toner cartridge 40*d*. The toner memories 71*a*, 71*b*, 71*c*, and 71*d* are each an example of a "memory".

The toner memories 71*a*, 71*b*, 71*c*, and 71*d* are each stored with various types of information related to a respective one of the toner cartridges 40*a*, 40*b*, 40*c*, and 40*d*. For example, the toner memories 71*a*, 71*b*, 71*c*, and 71*d* are each stored with at least one of identification information for identification of a respective one of the toner cartridges 40*a*, 40*b*, 40*c*, and 40*d*, and lifetime information indicating a lifetime of the respective one of the toner cartridges 40*a*, 40*b*, 40*c*, and 40*d*. The identification information of each of the toner cartridges 40*a*, 40*b*, 40*c*, and 40*d* includes, for example, at least one of a manufacturing serial number of a respective one of the toner cartridges 40*a*, 40*b*, 40*c*, and 40*d*, and an identification code indicating that the respective one of the toner cartridges 40*a*, 40*b*, 40*c*, and 40*d* is a genuine product. The lifetime information of each of the toner cartridges 40*a*, 40*b*, 40*c*, and 40*d* includes, for example, at least one of a capacity for toner, a lifetime of a respective one of the developing rollers 41*a*, 41*b*, 41*c*, and 41*d*, information indicating whether a respective one of the toner cartridges 40*a*, 40*b*, 40*c*, and 40*d* is new, the cumulative number of rotations of the respective one of the developing rollers 41*a*, 41*b*, 41*c*, and 41*d*, the cumulative number of printed sheets, and an error history. Further, each of the toner memories 71*a*, 71*b*, 71*c*, and 71*d* may store compatible models or the like of a respective one of the toner cartridges 40*a*, 40*b*, 40*c*, and 40*d* in addition to the identification information and the lifetime information. The processor 51 of the main body electrical substrate 20 reads out, as the above data signal, these pieces of information from each of the toner memories 71*a*, 71*b*, 71*c*, and 71*d*, and stores these pieces of information in a main body memory mounted on the main body electrical substrate 20. Then, the processor 51 uses these pieces of information stored in the main body memory to cause the image forming apparatus 1 to execute the printing process.

The toner substrate 70*a* includes a first toner terminal 72*a*, a second toner terminal 73*a*, and a toner ground terminal 74*a*. The toner substrate 70*b* includes a first toner terminal 72*b*, a second toner terminal 73*b*, and a toner ground terminal 74*b*. The toner substrate 70*c* includes a first toner terminal 72*c*, a second toner terminal 73*c*, and a toner ground terminal 74*c*. The toner substrate 70*d* includes a first toner terminal 72*d*, a second toner terminal 73*d*, and a toner ground terminal 74*d*.

The first toner terminals 72*a*, 72*b*, 72*c*, and 72*d* are each an example of a "first cartridge terminal". The second toner terminals 73*a*, 73*b*, 73*c*, and 73*d* are each an example of a "second cartridge terminal". The toner ground terminals 74*a*, 74*b*, 74*c*, and 74*d* are each an example of a "cartridge ground terminal".

In the toner substrate 70*a*, the first toner terminal 72*a*, the second toner terminal 73*a*, and the toner ground terminal 74*a* are electrically connected to the toner memory 71*a*. In the toner substrate 70*b*, the first toner terminal 72*b*, the second toner terminal 73*b*, and the toner ground terminal 74*b* are electrically connected to the toner memory 71*b*. In the toner substrate 70*c*, the first toner terminal 72*c*, the second toner terminal 73*c*, and the toner ground terminal 74*c* are electrically connected to the toner memory 71*c*. In the toner substrate 70*d*, the first toner terminal 72*d*, the second toner terminal 73*d*, and the toner ground terminal 74*d* are electrically connected to the toner memory 71*d*.

When the drum cartridge 30*a* to which the toner cartridge 40*a* is attached is attached to the main body frame 10, the first toner terminal 72*a* is electrically connected to the above first main body terminal 64*a*, the second toner terminal 73*a* is electrically connected to the above second main body terminal 65*a*, and the toner ground terminal 74*a* is electrically connected to the above main body ground terminal 66*a*.

When the drum cartridge 30*b* to which the toner cartridge 40*b* is attached is attached to the main body frame 10, the first toner terminal 72*b* is electrically connected to the above first main body terminal 64*b*, the second toner terminal 73*b* is electrically connected to the above second main body terminal 65*b*, and the toner ground terminal 74*b* is electrically connected to the above main body ground terminal 66*b*.

When the drum cartridge 30*c* to which the toner cartridge 40*c* is attached is attached to the main body frame 10, the first toner terminal 72*c* is electrically connected to the above first main body terminal 64*c*, the second toner terminal 73*c* is electrically connected to the above second main body terminal 65*c*, and the toner ground terminal 74*c* is electrically connected to the above main body ground terminal 66*c*.

When the drum cartridge 30*d* to which the toner cartridge 40*d* is attached is attached to the main body frame 10, the first toner terminal 72*d* is electrically connected to the above first main body terminal 64*d*, the second toner terminal 73*d* is electrically connected to the above second main body terminal 65*d*, and the toner ground terminal 74*d* is electrically connected to the above main body ground terminal 66*d*.

The toner substrate 70*a* includes a toner pull-up resistor 75*a*. The toner substrate 70*b* includes a toner pull-up resistor 75*b*. The toner substrate 70*c* includes a toner pull-up resistor 75*c*. The toner substrate 70*d* includes a toner pull-up resistor 75*d*. The toner pull-up resistors 75*a*, 75*b*, 75*c*, and 75*d* are each an example of a "cartridge pull-up resistor". The toner pull-up resistors 75*a*, 75*b*, 75*c*, and 75*d* are electrical resistors.

One end of the toner pull-up resistor 75*a* is electrically connected to the first toner terminal 72*a*. One end of the toner pull-up resistor 75*b* is electrically connected to the first toner terminal 72*b*. One end of the toner pull-up resistor 75*c* is electrically connected to the first toner terminal 72*c*. One end of the toner pull-up resistor 75*d* is electrically connected to the first toner terminal 72*d*.

The other end of the toner pull-up resistor 75*a* is electrically connected to the second toner terminal 73*a*. The other end of the toner pull-up resistor 75*b* is electrically connected to the second toner terminal 73*b*. The other end of the toner pull-up resistor 75*c* is electrically connected to the second toner terminal 73*c*. The other end of the toner pull-up resistor 75*d* is electrically connected to the second toner terminal 73*d*.

<1-4. Transmission of Ground Voltage, Power Supply Voltage, Data Signal, and Synchronization Signal>

The toner memory 71*a* takes the ground voltage from the ground portion 53 through the toner ground terminal 74*a*, the main body ground terminal 66*a*, the relay ground terminal 63, and the main ground terminal 57. The toner memory 71*b* takes the ground voltage from the ground portion 53 through the toner ground terminal 74*b*, the main body ground terminal 66*b*, the relay ground terminal 63, and the main ground terminal 57. The toner memory 71*c* takes the ground voltage from the ground portion 53 through the toner ground terminal 74*c*, the main body ground terminal 66*c*, the relay ground terminal 63, and the main ground terminal 57. The toner memory 71*d* takes the ground voltage from the ground portion 53 through the toner ground terminal 74*d*, the main body ground terminal 66*d*, the relay ground terminal 63, and the main ground terminal 57.

The toner memory 71*a* takes the power supply voltage from the power supply unit 52 through the first toner terminal 72*a*, the first main body terminal 64*a*, the first relay terminal 61, and the first main terminal 55. The toner memory 71*b* takes the power supply voltage from the power supply unit 52 through the first toner terminal 72*b*, the first main body terminal 64*b*, the first relay terminal 61, and the first main terminal 55. The toner memory 71*c* takes the power supply voltage from the power supply unit 52 through the first toner terminal 72*c*, the first main body terminal 64*c*, the first relay terminal 61, and the first main terminal 55. The toner memory 71*d* takes the power supply voltage from the power supply unit 52 through the first toner terminal 72*d*, the first main body terminal 64*d*, the first relay terminal 61, and the first main terminal 55.

The processor 51 transmits the synchronization signal and the data signal to the toner memory 71*a* through the second main terminal 56*a*, the second relay terminal 62*a*, the second main body terminal 65*a*, and the second toner terminal 73*a*. The processor 51 receives the data signal from the toner memory 71*a* through the second toner terminal 73*a*, the second main body terminal 65*a*, the second relay terminal 62*a*, and the second main terminal 56*a*.

The processor 51 transmits the synchronization signal and the data signal to the toner memory 71*b* through the second main terminal 56*b*, the second relay terminal 62*b*, the second main body terminal 65*b*, and the second toner terminal 73*b*. The processor 51 receives the data signal from the toner memory 71*b* through the second toner terminal 73*b*, the second main body terminal 65*b*, the second relay terminal 62*b*, and the second main terminal 56*b*.

The processor 51 transmits the synchronization signal and the data signal to the toner memory 71*c* through the second main terminal 56*c*, the second relay terminal 62*c*, the second main body terminal 65*c*, and the second toner terminal 73*c*. The processor 51 receives the data signal from the toner memory 71*c* through the second toner terminal 73*c*, the second main body terminal 65*c*, the second relay terminal 62*c*, and the second main terminal 56*c*.

The processor 51 transmits the synchronization signal and the data signal to the toner memory 71*d* through the second main terminal 56*d*, the second relay terminal 62*d*, the second main body terminal 65*d*, and the second toner terminal 73*d*. The processor 51 receives the data signal from the toner memory 71*d* through the second toner terminal 73*d*, the second main body terminal 65*d*, the second relay terminal 62*d*, and the second main terminal 56*d*.

The toner memories 71*a*, 71*b*, 71*c*, and 71*d* in the present embodiment each include a timer that generates a clock signal. Further, the synchronization signal in the present embodiment is a reset signal for resetting the timer of a respective one of the toner memories 71*a*, 71*b*, 71*c*, and 71*d*. Each of the toner memories 71*a*, 71*b*, 71*c*, and 71*d* generates the clock signal by resetting the timer based on the synchronization signal supplied from a respective one of the second toner terminals 73*a*, 73*b*, 73*c*, and 73*d*. Each of the toner memories 71*a*, 71*b*, 71*c*, and 71*d* takes the timing of the data signal according to the clock signal generated by a respective one of the toner memories 71*a*, 71*b*, 71*c*, and 71*d* themselves.

As described above, in the image forming apparatus 1, the power supply voltage, which is one of the power supply voltage, the data signal, and the synchronization signal, is transmitted between the main body electrical substrate 20 and the toner substrate 70*a* through the first main body terminal 64*a* and the first toner terminal 72*a*. The data signal and the synchronization signal, which are remaining two of the power supply voltage, the data signal, and the synchronization signal, are transmitted through the second main body terminal 65*a* and the second toner terminal 73*a*.

In the image forming apparatus 1, the power supply voltage, which is one of the power supply voltage, the data signal, and the synchronization signal, is transmitted between the main body electrical substrate 20 and the toner substrate 70*b* through the first main body terminal 64*b* and the first toner terminal 72*b*. The data signal and the synchronization signal, which are remaining two of the power supply voltage, the data signal, and the synchronization signal, are transmitted through the second main body terminal 65*b* and the second toner terminal 73*b*.

In the image forming apparatus 1, the power supply voltage, which is one of the power supply voltage, the data signal, and the synchronization signal, is transmitted between the main body electrical substrate 20 and the toner substrate 70*c* through the first main body terminal 64*c* and the first toner terminal 72*c*. The data signal and the synchronization signal, which are remaining two of the power supply voltage, the data signal, and the synchronization signal, are transmitted through the second main body terminal 65*c* and the second toner terminal 73*c*.

In the image forming apparatus 1, the power supply voltage, which is one of the power supply voltage, the data signal, and the synchronization signal, is transmitted between the main body electrical substrate 20 and the toner substrate 70*d* through the first main body terminal 64*d* and the first toner terminal 72*d*. The data signal and the synchronization signal, which are remaining two of the power supply voltage, the data signal, and the synchronization signal, are transmitted through the second main body terminal 65*d* and the second toner terminal 73*d*.

Therefore, it is possible to realize, by three parallel terminals, (1) taking of the ground voltage, (2) transmitting of the power supply voltage, (3) transmitting of the data signal, and (4) transmitting of the synchronization signal between the main body electrical substrate 20 and each of the toner substrates 70*a*, 70*b*, 70*c*, and 70*d*. As a result, the number of terminals can be reduced as compared with a case where (1) to (4) are realized by four parallel terminals.

The toner substrate 70*a* in the present embodiment includes the toner pull-up resistor 75*a*. The one end of the toner pull-up resistor 75*a* is electrically connected to the first toner terminal 72*a*. The other end of the toner pull-up resistor 75*a* is electrically connected to the second toner terminal 73*a*.

Thus, the data signal and the synchronization signal transmitted through the second toner terminal 73*a* are each less likely to take a voltage value other than high/low. Therefore, in the toner substrate 70*a*, the data signal and the synchronization signal are less likely to be influenced by noise. As a result, even when a wiring between the main body electrical substrate 20 and the toner substrate 70*a* is long, the data signal and the synchronization signal can be stably transmitted.

Similarly, in the toner substrate 70*b*, due to the toner pull-up resistor 75*b*, the data signal and the synchronization signal are also less likely to be influenced by noise. Similarly, in the toner substrate 70*c*, due to the toner pull-up resistor 75*c*, the data signal and the synchronization signal are also less likely to be influenced by noise. Similarly, in the toner substrate 70*d*, due to the toner pull-up resistor 75*d*, the data signal and the synchronization signal are also less likely to be influenced by noise.

The main substrate 50 in the present embodiment includes the main body pull-up resistors 58*a*, 58*b*, 58*c*, and 58*d*. The one ends of the main body pull-up resistors 58*a*, 58*b*, 58*c*, and 58*d* are electrically connected to the first main body terminals 64*a*, 64*b*, 64*c*, and 64*d* through the first main terminal 55 and the first relay terminal 61. The other end of the main body pull-up resistor 58*a* is electrically connected to the second main body terminal 65*a* through the second main terminal 56*a* and the second relay terminal 62*a*. The other end of the main body pull-up resistor 58*b* is electrically connected to the second main body terminal 65*b* through the second main terminal 56*b* and the second relay terminal 62*b*. The other end of the main body pull-up resistor 58*c* is electrically connected to the second main body terminal 65*c* through the second main terminal 56*c* and the second relay terminal 62*c*. The other end of the main body pull-up resistor 58*d* is electrically connected to the second main body terminal 65*d* through the second main terminal 56*d* and the second relay terminal 62*d*.

Thus, the data signal and the synchronization signal transmitted through each of the second main body terminals 65*a*, 65*b*, 65*c*, and 65*d* are each less likely to take a voltage value other than high/low. Therefore, in the main body electrical substrate 20, the data signal and the synchronization signal are less likely to be influenced by noise. As a result, even when the wiring between the main body electrical substrate 20 and the toner substrate 70*a* is long, the data signal and the synchronization signal can be stably transmitted.

Further, the main substrate 50 in the present embodiment includes the main body pull-down resistor 59. The one end of the main body pull-down resistor 59 is electrically connected to the first main body terminals 64*a*, 64*b*, 64*c*, and 64*d* through the first main terminal 55 and the first relay terminal 61. The other end of the main body pull-down resistor 59 is electrically connected to the main body ground terminals 66*a*, 66*b*, 66*c*, and 66*d* through the main ground terminal 57 and the relay ground terminal 63.

Thus, when static electricity enters the first main body terminals 64*a*, 64*b*, 64*c*, and 64*d*, the static electricity can be released to the ground portion 53 through the first relay terminal 61, the first main terminal 55, and the main body pull-down resistor 59. Therefore, it is possible to prevent the processor 51 of the main substrate 50 from erroneously operating due to the static electricity.

Further, the main substrate 50 in the present embodiment includes the switch 54. By controlling the switch 54 by the processor 51, it is possible to switch between supply and stop of the power supply voltage to each of the first main body terminals 64*a*, 64*b*, 64*c*, and 64*d*. Thus, the supply of the power supply voltage can be stopped by turning off the switch 54 when the power supply voltage is unnecessary. As a result, power consumption of the image forming apparatus 1 can be reduced.

2. Second Embodiment

Next, a second embodiment will be described. The second embodiment is different from the first embodiment in that drum cartridges each include a drum substrate. Hereinafter, differences from the first embodiment will be mainly described, and repeated descriptions will be omitted for the same portions as those in the first embodiment.

Figure 3:
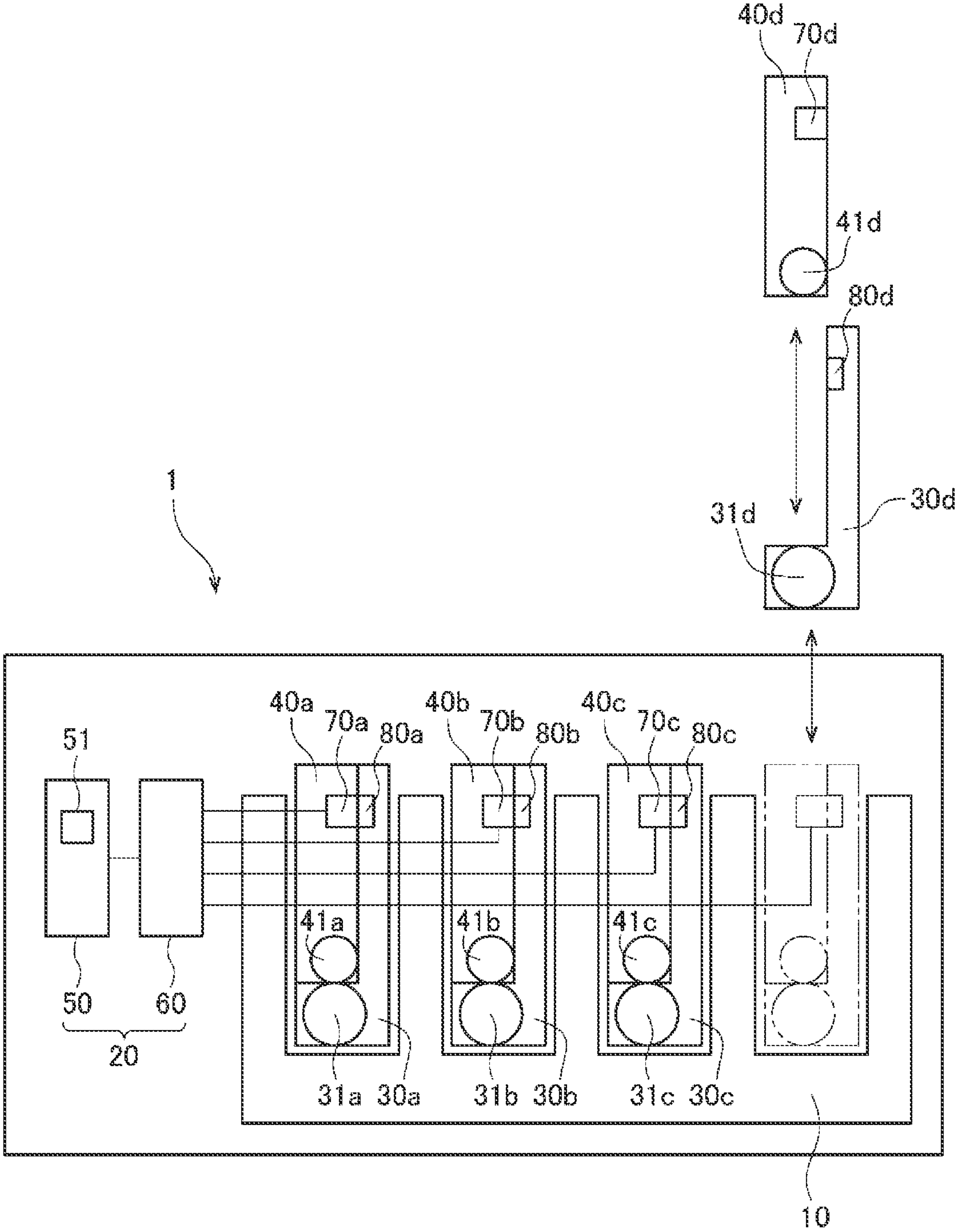
FIG. 3 is a conceptual diagram of an image forming apparatus.

FIG. 3 is a conceptual diagram of an image forming apparatus 1 according to the second embodiment. As shown in FIG. 3, the drum cartridge 30*a* in the present embodiment includes a drum substrate 80*a*. The drum cartridge 30*b* includes a drum substrate 80*b*. The drum cartridge 30*c* includes a drum substrate 80*c*. The drum cartridge 30*d* includes a drum substrate 80*d*.

The drum substrates 80*a*, 80*b*, 80*c*, and 80*d* are each an example of the "cartridge substrate". The drum substrate 80*a* is located at an outer surface of the drum cartridge 30*a*. The drum substrate 80*b* is located at an outer surface of the drum cartridge 30*b*. The drum substrate 80*c* is located at an outer surface of the drum cartridge 30*c*. The drum substrate 80*d* is located at an outer surface of the drum cartridge 30*d*.

When the toner cartridge 40*a* is attached to the drum cartridge 30*a*, the drum substrate 80*a* is electrically connected to the toner substrate 70*a*. When the toner cartridge 40*b* is attached to the drum cartridge 30*b*, the drum substrate 80*b* is electrically connected to the toner substrate 70*b*. When the toner cartridge 40*c* is attached to the drum cartridge 30*c*, the drum substrate 80*c* is electrically connected to the toner substrate 70*c*. When the toner cartridge 40*d* is attached to the drum cartridge 30*d*, the drum substrate 80*d* is electrically connected to the toner substrate 70*d*.

When the drum cartridge 30*a* to which the toner cartridge 40*a* is attached is attached to the main body frame 10, the drum substrate 80*a* is electrically connected to the main body electrical substrate 20 through the toner substrate 70*a*. When the drum cartridge 30*b* to which the toner cartridge 40*b* is attached is attached to the main body frame 10, the drum substrate 80*b* is electrically connected to the main body electrical substrate 20 through the toner substrate 70*b*. When the drum cartridge 30*c* to which the toner cartridge 40*c* is attached is attached to the main body frame 10, the drum substrate 80*c* is electrically connected to the main body electrical substrate 20 through the toner substrate 70*c*. When the drum cartridge 30*d* to which the toner cartridge 40*d* is attached is attached to the main body frame 10, the drum substrate 80*d* is electrically connected to the main body electrical substrate 20 through the toner substrate 70*d*.

Figure 4:
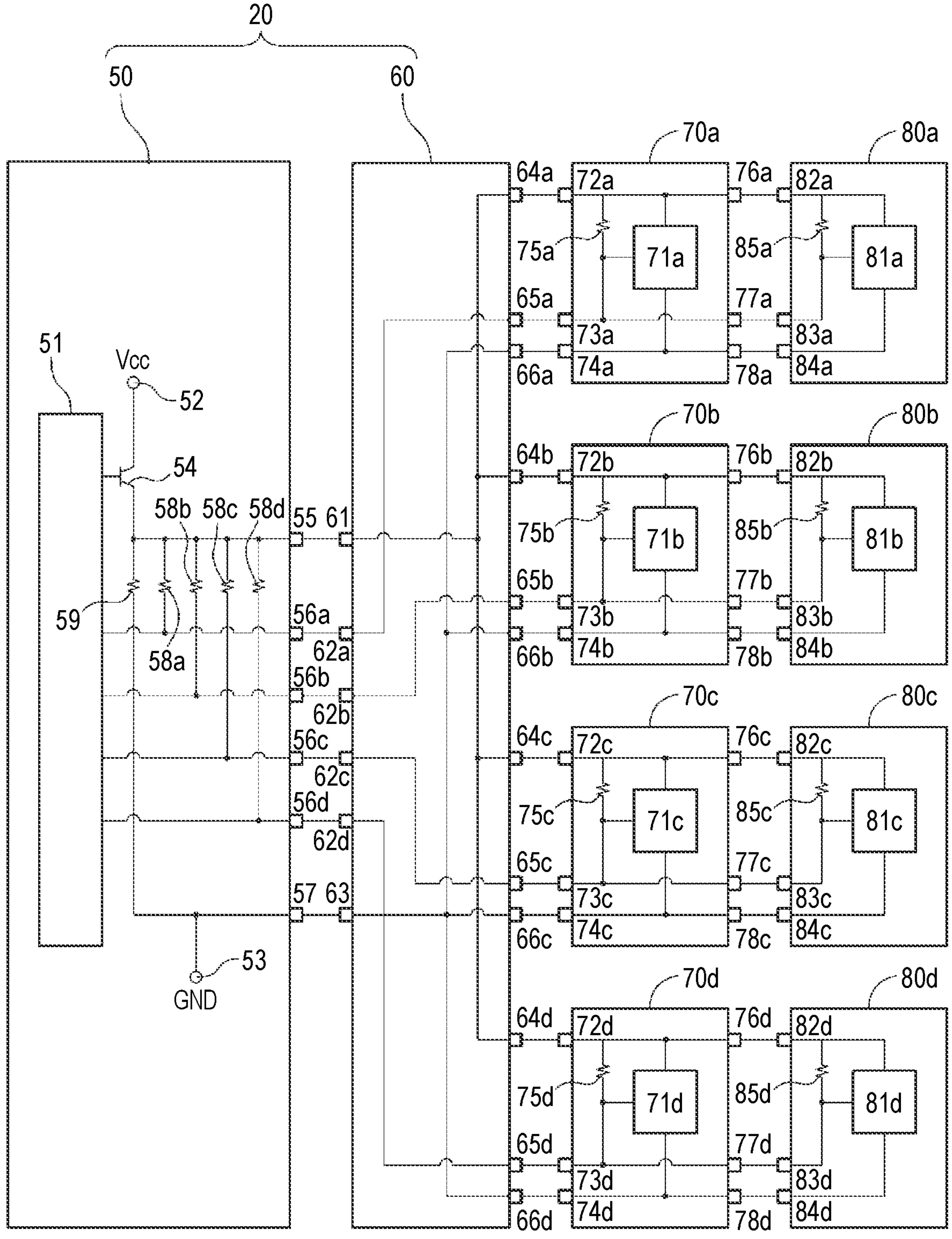
FIG. 4 is a block diagram showing electrical connection among the main body electrical substrate, the four toner substrates, and four drum substrates.

FIG. 4 is a block diagram showing electrical connection among the main body electrical substrate 20, the four toner substrates 70*a*, 70*b*, 70*c*, and 70*d*, and the four drum substrates 80*a*, 80*b*, 80*c*, and 80*d*.

As shown in FIG. 4, the drum substrate 80*a* includes a drum memory 81*a*. The drum memory 81*a* is a storage medium that stores information related to the drum cartridge 30*a*. The drum substrate 80*b* includes a drum memory 81*b*. The drum memory 81*b* is a storage medium that stores information related to the drum cartridge 30*b*. The drum substrate 80*c* includes a drum memory 81*c*. The drum memory 81*c* is a storage medium that stores information related to the drum cartridge 30*c*. The drum substrate 80*d* includes a drum memory 81*d*. The drum memory 81*d* is a storage medium that stores information related to the drum cartridge 30*d*. The drum memories 81*a*, 81*b*, 81*c*, and 81*d* are each an example of the "memory".

The drum memories 81*a*, 81*b*, 81*c*, and 81*d* are each stored with various types of information related to a respective one of the drum cartridges 30*a*, 30*b*, 30*c*, and 30*d*. For example, the drum memories 81*a*, 81*b*, 81*c*, and 81*d* are each stored with at least one of identification information for identification of a respective one of the drum cartridges 30*a*, 30*b*, 30*c*, and 30*d*, and lifetime information indicating a lifetime of the respective one of the drum cartridges 30*a*, 30*b*, 30*c*, and 30*d*. The identification information of each of the drum cartridges 30*a*, 30*b*, 30*c*, and 30*d* includes, for example, at least one of a manufacturing serial number of a respective one of the drum cartridges 30*a*, 30*b*, 30*c*, and 30*d*, and an identification code indicating that the respective one of the drum cartridges 30*a*, 30*b*, 30*c*, and 30*d* is a genuine product. The lifetime information of each of the drum cartridges 30*a*, 30*b*, 30*c*, and 30*d* includes, for example, at least one of a lifetime of a respective one of the photosensitive drums 31*a*, 31*b*, 31*c*, and 31*d*, information indicating whether a respective one of the drum cartridges 30*a*, 30*b*, 30*c*, and 30*d* is new, the cumulative number of rotations of the respective one of the photosensitive drums 31*a*, 31*b*, 31*c*, and 31*d*, a cumulative charging time of the respective one of the photosensitive drums 31*a*, 31*b*, 31*c*, and 31*d*, the cumulative number of printed sheets, and an error history.

Further, each of the drum memories 81*a*, 81*b*, 81*c*, and 81*d* may store compatible models of a respective one of the drum cartridges 30*a*, 30*b*, 30*c*, and 30*d*, charging characteristics of a respective one of the photosensitive drums 31*a*, 31*b*, 31*c*, and 31*d*, or the like in addition to the identification information and the lifetime information. The processor 51 of the main body electrical substrate 20 reads out, as the above data signal, these pieces of information from each of the drum memories 81*a*, 81*b*, 81*c*, and 81*d*, and stores these pieces of information in the main body memory mounted on the main body electrical substrate 20. Then, the processor 51 uses these pieces of information stored in the main body memory to cause the image forming apparatus 1 to execute a printing process.

The drum substrate 80*a* includes a first drum terminal 82*a*, a second drum terminal 83*a*, and a drum ground terminal 84*a*. The drum substrate 80*b* includes a first drum terminal 82*b*, a second drum terminal 83*b*, and a drum ground terminal 84*b*. The drum substrate 80*c* includes a first drum terminal 82*c*, a second drum terminal 83*c*, and a drum ground terminal 84*c*. The drum substrate 80*d* includes a first drum terminal 82*d*, a second drum terminal 83*d*, and a drum ground terminal 84*d*.

The first drum terminals 82*a*, 82*b*, 82*c*, and 82*d* are each an example of the "first cartridge terminal". The second drum terminals 83*a*, 83*b*, 83*c*, and 83*d* are each an example of the "second cartridge terminal". The drum ground terminals 84*a*, 84*b*, 84*c*, and 84*d* are each an example of the "cartridge ground terminal".

In the drum substrate 80*a*, the first drum terminal 82*a*, the second drum terminal 83*a*, and the drum ground terminal 84*a* are electrically connected to the drum memory 81*a*. In the drum substrate 80*b*, the first drum terminal 82*b*, the second drum terminal 83*b*, and the drum ground terminal 84*b* are electrically connected to the drum memory 81*b*. In the drum substrate 80*c*, the first drum terminal 82*c*, the second drum terminal 83*c*, and the drum ground terminal 84*c* are electrically connected to the drum memory 81*c*. In the drum substrate 80*d*, the first drum terminal 82*d*, the second drum terminal 83*d*, and the drum ground terminal 84*d* are electrically connected to the drum memory 81*d*.

The toner substrate 70*a* includes a first toner relay terminal 76*a*, a second toner relay terminal 77*a*, and a toner relay ground terminal 78*a*. The first toner relay terminal 76*a* is electrically connected to the first toner terminal 72*a*. The second toner relay terminal 77*a* is electrically connected to the second toner terminal 73*a*. The toner relay ground terminal 78*a* is electrically connected to the toner ground terminal 74*a*.

The toner substrate 70*b* includes a first toner relay terminal 76*b*, a second toner relay terminal 77*b*, and a toner relay ground terminal 78*b*. The first toner relay terminal 76*b* is electrically connected to the first toner terminal 72*b*. The second toner relay terminal 77*b* is electrically connected to the second toner terminal 73*b*. The toner relay ground terminal 78*b* is electrically connected to the toner ground terminal 74*b*.

The toner substrate 70*c* includes a first toner relay terminal 76*c*, a second toner relay terminal 77*c*, and a toner relay ground terminal 78*c*. The first toner relay terminal 76*c* is electrically connected to the first toner terminal 72*c*. The second toner relay terminal 77*c* is electrically connected to the second toner terminal 73*c*. The toner relay ground terminal 78*c* is electrically connected to the toner ground terminal 74*c*.

The toner substrate 70*d* includes a first toner relay terminal 76*d*, a second toner relay terminal 77*d*, and a toner relay ground terminal 78*d*. The first toner relay terminal 76*d* is electrically connected to the first toner terminal 72*d*. The second toner relay terminal 77*d* is electrically connected to the second toner terminal 73*d*. The toner relay ground terminal 78*d* is electrically connected to the toner ground terminal 74*d*.

When the toner cartridge 40*a* is attached to the drum cartridge 30*a*, the first drum terminal 82*a* is electrically connected to the first toner relay terminal 76*a*, the second drum terminal 83*a* is electrically connected to the second toner relay terminal 77*a*, and the drum ground terminal 84*a* is electrically connected to the toner relay ground terminal 78*a*.

When the toner cartridge 40*b* is attached to the drum cartridge 30*b*, the first drum terminal 82*b* is electrically connected to the first toner relay terminal 76*b*, the second drum terminal 83*b* is electrically connected to the second toner relay terminal 77*b*, and the drum ground terminal 84*b* is electrically connected to the toner relay ground terminal 78*b*.

When the toner cartridge 40*c* is attached to the drum cartridge 30*c*, the first drum terminal 82*c* is electrically connected to the first toner relay terminal 76*c*, the second drum terminal 83*c* is electrically connected to the second toner relay terminal 77*c*, and the drum ground terminal 84*c* is electrically connected to the toner relay ground terminal 78*c*.

When the toner cartridge 40*d* is attached to the drum cartridge 30*d*, the first drum terminal 82*d* is electrically connected to the first toner relay terminal 76*d*, the second drum terminal 83*d* is electrically connected to the second toner relay terminal 77*d*, and the drum ground terminal 84*d* is electrically connected to the toner relay ground terminal 78*d*.

The drum substrate 80*a* includes a drum pull-up resistor 85*a*. The drum substrate 80*b* includes a drum pull-up resistor 85*b*. The drum substrate 80*c* includes a drum pull-up resistor 85*c*. The drum substrate 80*d* includes a drum pull-up resistor 85*d*. The drum pull-up resistors 85*a*, 85*b*, 85*c*, and 85*d* are each an example of the "cartridge pull-up resistor". The drum pull-up resistors 85*a*, 85*b*, 85*c*, and 85*d* are electrical resistors.

One end of the drum pull-up resistor 85*a* is electrically connected to the first drum terminal 82*a*. The other end of the drum pull-up resistor 85*a* is electrically connected to the second drum terminal 83*a*. One end of the drum pull-up resistor 85*b* is electrically connected to the first drum terminal 82*b*. The other end of the drum pull-up resistor 85*b* is electrically connected to the second drum terminal 83*b*. One end of the drum pull-up resistor 85*c* is electrically connected to the first drum terminal 82*c*. The other end of the drum pull-up resistor 85*c* is electrically connected to the second drum terminal 83*c*. One end of the drum pull-up resistor 85*d* is electrically connected to the first drum terminal 82*d*. The other end of the drum pull-up resistor 85*d* is electrically connected to the second drum terminal 83*d*.

The drum memory 81*a* takes the ground voltage from the ground portion 53 through the drum ground terminal 84*a*, the toner relay ground terminal 78*a*, the toner ground terminal 74*a*, the main body ground terminal 66*a*, the relay ground terminal 63, and the main ground terminal 57. The drum memory 81*b* takes the ground voltage from the ground portion 53 through the drum ground terminal 84*b*, the toner relay ground terminal 78*b*, the toner ground terminal 74*b*, the main body ground terminal 66*b*, the relay ground terminal 63, and the main ground terminal 57. The drum memory 81*c* takes the ground voltage from the ground portion 53 through the drum ground terminal 84*c*, the toner relay ground terminal 78*c*, the toner ground terminal 74*c*, the main body ground terminal 66*c*, the relay ground terminal 63, and the main ground terminal 57. The drum memory 81*d* takes the ground voltage from the ground portion 53 through the drum ground terminal 84*d*, the toner relay ground terminal 78*d*, the toner ground terminal 74*d*, the main body ground terminal 66*d*, the relay ground terminal 63, and the main ground terminal 57.

The drum memory 81*a* takes the power supply voltage from the power supply unit 52 through the first drum terminal 82*a*, the first toner relay terminal 76*a*, the first toner terminal 72*a*, the first main body terminal 64*a*, the first relay terminal 61, and the first main terminal 55. The drum memory 81*b* takes the power supply voltage from the power supply unit 52 through the first drum terminal 82*b*, the first toner relay terminal 76*b*, the first toner terminal 72*b*, the first main body terminal 64*b*, the first relay terminal 61, and the first main terminal 55. The drum memory 81*c* takes the power supply voltage from the power supply unit 52 through the first drum terminal 82*c*, the first toner relay terminal 76*c*, the first toner terminal 72*c*, the first main body terminal 64*c*, the first relay terminal 61, and the first main terminal 55. The drum memory 81*d* takes the power supply voltage from the power supply unit 52 through the first drum terminal 82*d*, the first toner relay terminal 76*d*, the first toner terminal 72*d*, the first main body terminal 64*d*, the first relay terminal 61, and the first main terminal 55.

The processor 51 transmits the synchronization signal and the data signal to the drum memory 81*a* through the second main terminal 56*a*, the second relay terminal 62*a*, the second main body terminal 65*a*, the second toner terminal 73*a*, the second toner relay terminal 77*a*, and the second drum terminal 83*a*. The processor 51 receives the data signal from the drum memory 81*a* through the second drum terminal 83*a*, the second toner relay terminal 77*a*, the second toner terminal 73*a*, the second main body terminal 65*a*, the second relay terminal 62*a*, and the second main terminal 56*a*.

The processor 51 transmits the synchronization signal and the data signal to the drum memory 81*b* through the second main terminal 56*b*, the second relay terminal 62*b*, the second main body terminal 65*b*, the second toner terminal 73*b*, the second toner relay terminal 77*b*, and the second drum terminal 83*b*. The processor 51 receives the data signal from the drum memory 81*b* through the second drum terminal 83*b*, the second toner relay terminal 77*b*, the second toner terminal 73*b*, the second main body terminal 65*b*, the second relay terminal 62*b*, and the second main terminal 56*b*.

The processor 51 transmits the synchronization signal and the data signal to the drum memory 81*c* through the second main terminal 56*c*, the second relay terminal 62*c*, the second main body terminal 65*c*, the second toner terminal 73*c*, the second toner relay terminal 77*c*, and the second drum terminal 83*c*. The processor 51 receives the data signal from the drum memory 81*c* through the second drum terminal 83*c*, the second toner relay terminal 77*c*, the second toner terminal 73*c*, the second main body terminal 65*c*, the second relay terminal 62*c*, and the second main terminal 56*c*.

The processor 51 transmits the synchronization signal and the data signal to the drum memory 81*d* through the second main terminal 56*d*, the second relay terminal 62*d*, the second main body terminal 65*d*, the second toner terminal 73*d*, the second toner relay terminal 77*d*, and the second drum terminal 83*d*. The processor 51 receives the data signal from the drum memory 81*d* through the second drum terminal 83*d*, the second toner relay terminal 77*d*, the second toner terminal 73*d*, the second main body terminal 65*d*, the second relay terminal 62*d*, and the second main terminal 56*d*.

The drum memories 81*a*, 81*b*, 81*c*, and 81*d* in the present embodiment each include a timer that generates a clock signal. Further, the synchronization signal in the present embodiment is a reset signal for resetting the timer of a respective one of the drum memories 81*a*, 81*b*, 81*c*, and 81*d*. Each of the drum memories 81*a*, 81*b*, 81*c*, and 81*d* generates the clock signal by resetting the timer based on the synchronization signal supplied from a respective one of the second drum terminals 83*a*, 83*b*, 83*c*, and 83*d*. The drum memory 81*a* takes a timing of the data signal according to the clock signal generated by the drum memory 81*a* itself As described above, in the image forming apparatus 1, the power supply voltage, which is one of the power supply voltage, the data signal, and the synchronization signal, is transmitted between the main body electrical substrate 20 and the drum substrate 80*a* through the first main body terminal 64*a*, the first toner terminal 72*a*, the first toner relay terminal 76*a*, and the first drum terminal 82*a*. The data signal and the synchronization signal, which are remaining two of the power supply voltage, the data signal, and the synchronization signal, are transmitted through the second main body terminal 65*a*, the second toner terminal 73*a*, the second toner relay terminal 77*a*, and the second drum terminal 83*a*.

In the image forming apparatus 1, the power supply voltage, which is one of the power supply voltage, the data signal, and the synchronization signal, is transmitted between the main body electrical substrate 20 and the drum substrate 80*b* through the first main body terminal 64*b*, the first toner terminal 72*b*, the first toner relay terminal 76*b*, and the first drum terminal 82*b*. The data signal and the synchronization signal, which are remaining two of the power supply voltage, the data signal, and the synchronization signal, are transmitted through the second main body terminal 65*b*, the second toner terminal 73*b*, the second toner relay terminal 77*b*, and the second drum terminal 83*b*.

In the image forming apparatus 1, the power supply voltage, which is one of the power supply voltage, the data signal, and the synchronization signal, is transmitted between the main body electrical substrate 20 and the drum substrate 80*c* through the first main body terminal 64*c*, the first toner terminal 72*c*, the first toner relay terminal 76*c*, and the first drum terminal 82*c*. The data signal and the synchronization signal, which are remaining two of the power supply voltage, the data signal, and the synchronization signal, are transmitted through the second main body terminal 65*c*, the second toner terminal 73*c*, the second toner relay terminal 77*c*, and the second drum terminal 83*c*.

In the image forming apparatus 1, the power supply voltage, which is one of the power supply voltage, the data signal, and the synchronization signal, is transmitted between the main body electrical substrate 20 and the drum substrate 80*d* through the first main body terminal 64*d*, the first toner terminal 72*d*, the first toner relay terminal 76*d*, and the first drum terminal 82*d*. The data signal and the synchronization signal, which are remaining two of the power supply voltage, the data signal, and the synchronization signal, are transmitted through the second main body terminal 65*d*, the second toner terminal 73*d*, the second toner relay terminal 77*d*, and the second drum terminal 83*d*.

Therefore, it is possible to realize, by three parallel terminals, (1) taking of the ground voltage, (2) transmitting of the power supply voltage, (3) transmitting of the data signal, and (4) transmitting of the synchronization signal between the main body electrical substrate 20 and each of the drum substrates 80*a*, 80*b*, 80*c*, and 80*d*. As a result, the number of terminals can be reduced as compared with the case where (1) to (4) are realized by the four parallel terminals.

The drum substrate 80*a* in the present embodiment includes the drum pull-up resistor 85*a*. The one end of the drum pull-up resistor 85*a* is electrically connected to the first drum terminal 82*a*. The other end of the drum pull-up resistor 85*a* is electrically connected to the second drum terminal 83*a*.

Thus, the data signal and the synchronization signal transmitted through the second drum terminal 83*a* are each less likely to take a voltage value other than high/low. Therefore, in the drum substrate 80*a*, the data signal and the synchronization signal are less likely to be influenced by noise. As a result, even when a wiring between the main body electrical substrate 20 and the drum substrate 80*a* is long, the data signal and the synchronization signal can be stably transmitted.

Similarly, in the drum substrate 80*b*, due to the drum pull-up resistor 85*b*, the data signal and the synchronization signal are also less likely to be influenced by noise. Similarly, in the drum substrate 80*c*, due to the drum pull-up resistor 85*c*, the data signal and the synchronization signal are also less likely to be influenced by noise. Similarly, in the drum substrate 80*d*, due to the drum pull-up resistor 85*d*, the data signal and the synchronization signal are also less likely to be influenced by noise.

In the present embodiment, the drum substrate 80*a* is electrically connected to the main body electrical substrate 20 through the toner substrate 70*a*. Therefore, the number of terminals can be reduced as compared with a case where the toner substrate 70*a* and the drum substrate 80*a* are connected to the main body electrical substrate 20 in parallel. In the present embodiment, the drum substrate 80*b* is electrically connected to the main body electrical substrate 20 through the toner substrate 70*b*. Therefore, the number of terminals can be reduced as compared with a case where the toner substrate 70*b* and the drum substrate 80*b* are connected to the main body electrical substrate 20 in parallel. In the present embodiment, the drum substrate 80*c* is electrically connected to the main body electrical substrate 20 through the toner substrate 70*c*. Therefore, the number of terminals can be reduced as compared with a case where the toner substrate 70*c* and the drum substrate 80*c* are connected to the main body electrical substrate 20 in parallel. In the present embodiment, the drum substrate 80*d* is electrically connected to the main body electrical substrate 20 through the toner substrate 70*d*. Therefore, the number of terminals can be reduced as compared with a case where the toner substrate 70*d* and the drum substrate 80*d* are connected to the main body electrical substrate 20 in parallel.

3. Modifications

Although the first embodiment and the second embodiment have been described above, the present disclosure is not limited to the above embodiments.

<3-1. First Modification>

Figure 5:
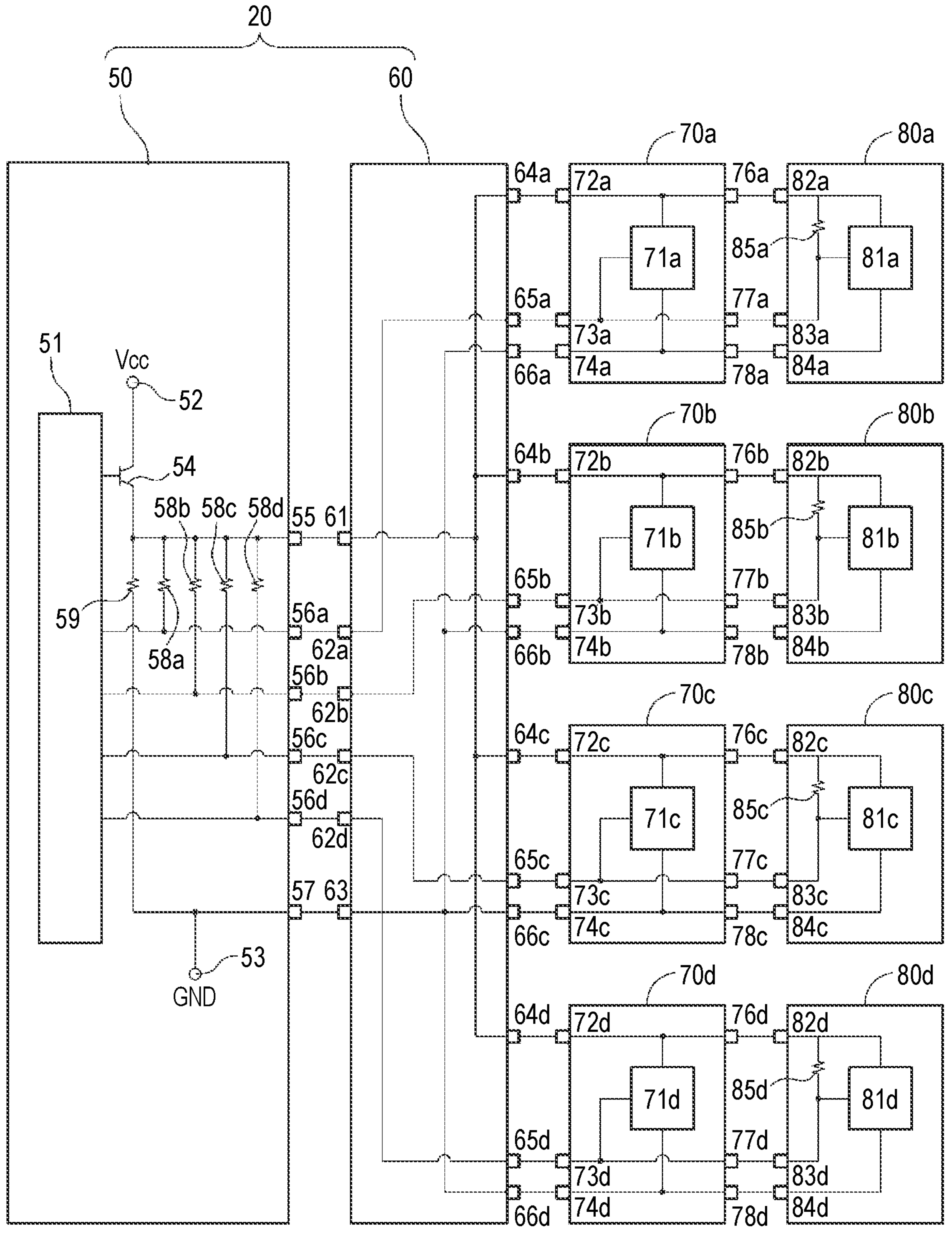
FIG. 5 is a block diagram showing electrical connection among the main body electrical substrate, the four toner substrates, and the four drum substrates.

FIG. 5 is a block diagram showing electrical connection among the main body electrical substrate 20, the four toner substrates 70*a*, 70*b*, 70*c*, and 70*d*, and the four drum substrates 80*a*, 80*b*, 80*c*, and 80*d* in a first modification. The first modification is different from the second embodiment in that each of the toner substrates 70*a*, 70*b*, 70*c*, and 70*d* does not include a toner pull-up resistor.

A distance between the toner substrate 70*a* and the drum substrate 80*a* is short. Specifically, a wiring distance between the toner substrate 70*a* and the drum substrate 80*a* is shorter than a wiring distance between the main body electrical substrate 20 and the toner substrate 70*a*. Therefore, when the drum substrate 80*a* includes the drum pull-up resistor 85*a*, the first toner relay terminal 76*a* of the toner substrate 70*a* is connected to the first drum terminal 82*a* of the drum substrate 80*a*, and the second toner relay terminal 77*a* of the toner substrate 70*a* is connected to the second drum terminal 83*a* of the drum substrate 80*a*, an influence of the noise on the data signal and the synchronization signal can be reduced to some extent in the toner substrate 70*a* even if the toner substrate 70*a* is not provided with the toner pull-up resistor.

Similarly, in each of the other toner substrates 70*b*, 70*c*, and 70*d*, an influence of the noise can also be reduced by a respective one of the drum pull-up resistors 85*b*, 85*c*, and 85*d* without providing the toner pull-up resistor. As a result, it is possible to stably transmit the data signal and the synchronization signal while reducing the number of components of each of the toner substrates 70*a*, 70*b*, 70*c*, and 70*d*.

<3-2. Second Modification>

Figure 6:
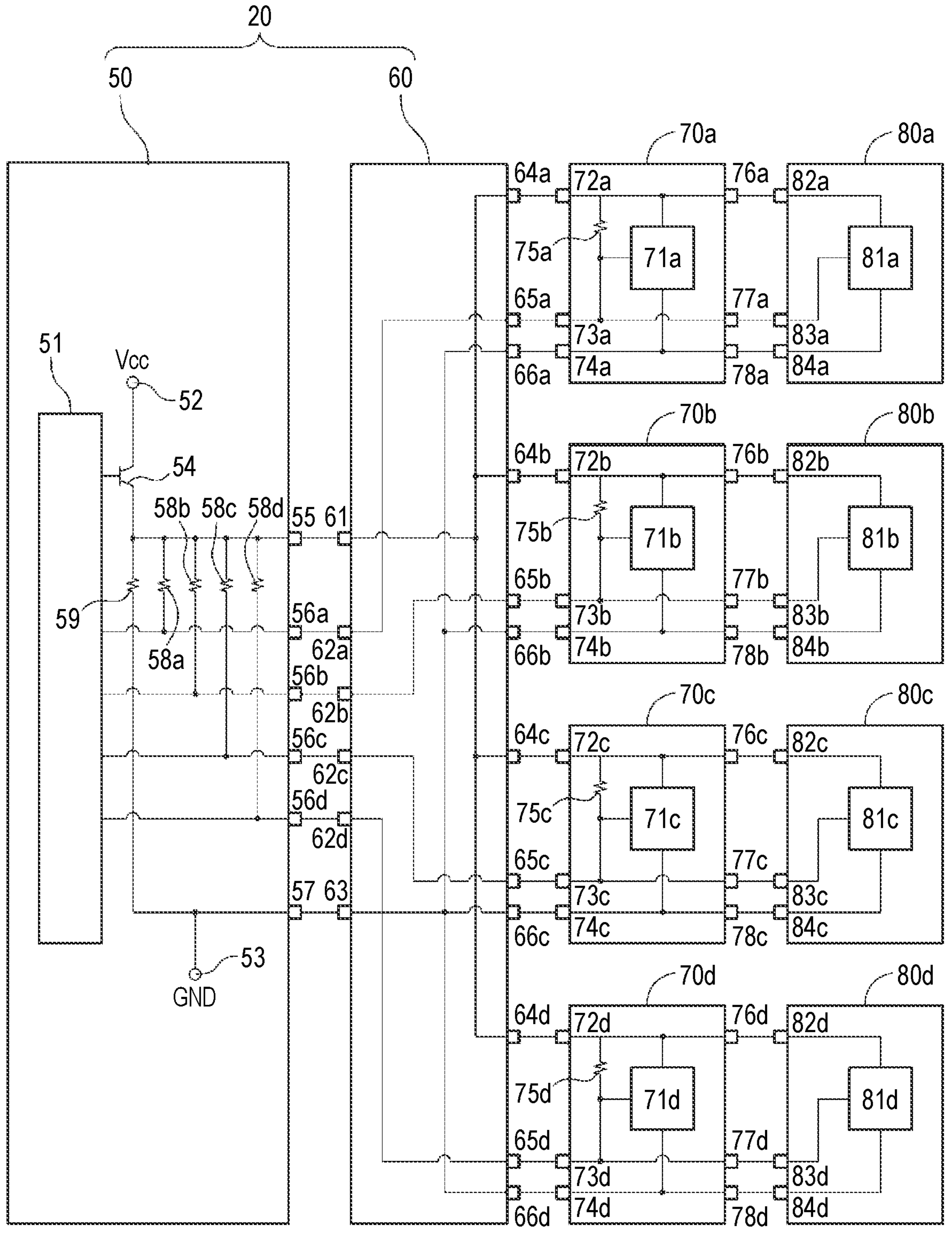
FIG. 6 is a block diagram showing electrical connection among the main body electrical substrate, the four toner substrates, and the four drum substrates.

FIG. 6 is a block diagram showing electrical connection among the main body electrical substrate 20, the four toner substrates 70*a*, 70*b*, 70*c*, and 70*d*, and the four drum substrates 80*a*, 80*b*, 80*c*, and 80*d* in a second modification. The second modification is different from the second embodiment in that each of the drum substrates 80*a*, 80*b*, 80*c*, and 80*d* does not include a drum pull-up resistor.

A distance between the toner substrate 70*a* and the drum substrate 80*a* is short. Specifically, a wiring distance between the toner substrate 70*a* and the drum substrate 80*a* is shorter than a wiring distance between the main body electrical substrate 20 and the toner substrate 70*a*. Therefore, when the toner substrate 70*a* includes the toner pull-up resistor 75*a*, an influence of the noise on the data signal and the synchronization signal can be reduced to some extent in the drum substrate 80*a* even if the drum substrate 80*a* is not provided with the drum pull-up resistor.

Similarly, in each of the other drum substrates 80*b*, 80*c*, and 80*d*, an influence of the noise on the data signal and the synchronization signal can also be reduced by a respective one of the toner pull-up resistors 75*b*, 75*c*, and 75*d* without providing the drum pull-up resistor. As a result, it is possible to stably transmit the data signal and the synchronization signal while reducing the number of components of each of the drum substrates 80*a*, 80*b*, 80*c*, and 80*d*.

<3-3. Third Modification>

Figure 7:
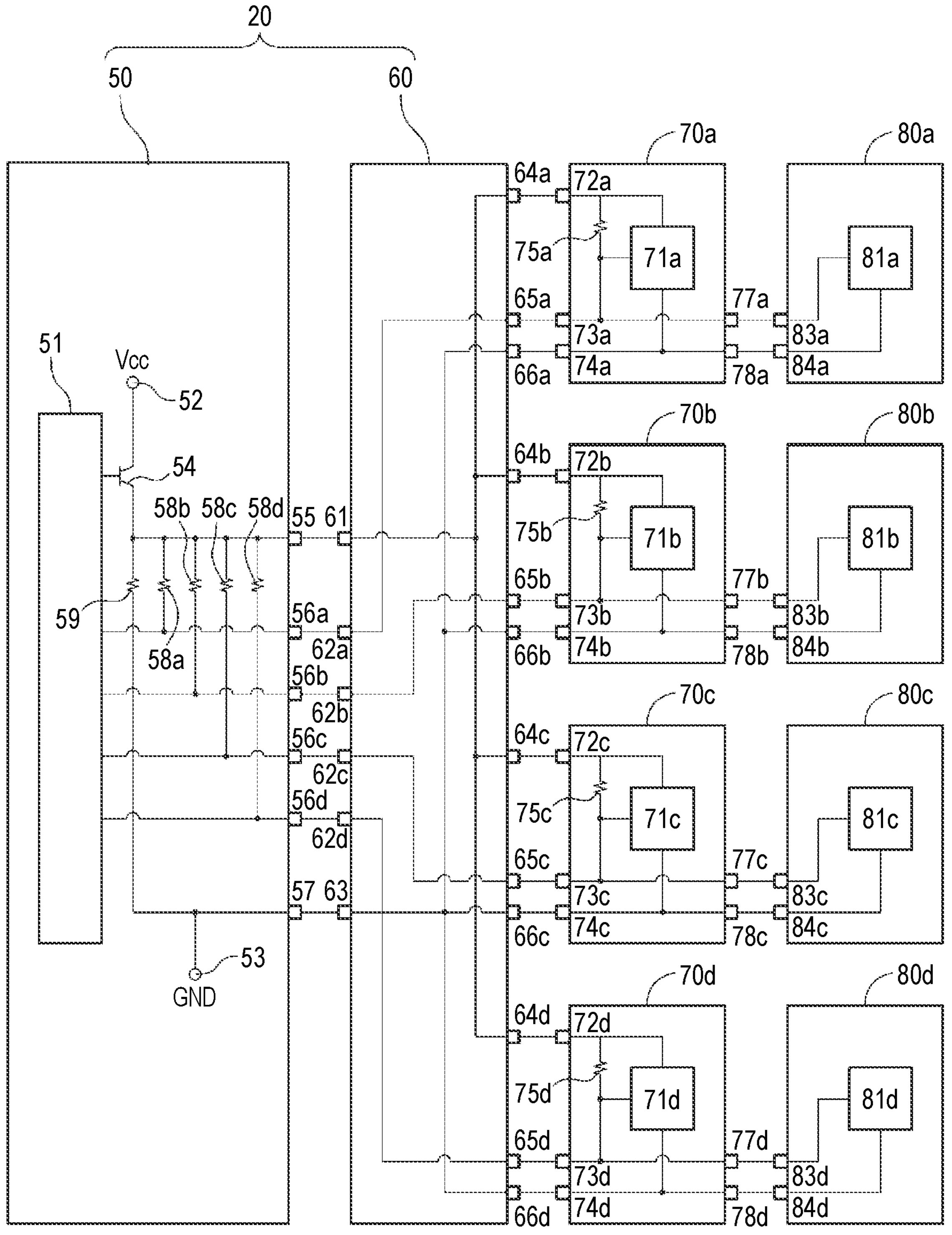
FIG. 7 is a block diagram showing electrical connection among the main body electrical substrate, the four toner substrates, and the four drum substrates.

FIG. 7 is a block diagram showing electrical connection among the main body electrical substrate 20, the four toner substrates 70*a*, 70*b*, 70*c*, and 70*d*, and the four drum substrates 80*a*, 80*b*, 80*c*, and 80*d* in a third modification. The third modification is different from the second modification in that each of the drum substrates 80*a*, 80*b*, 80*c*, and 80*d* does not include a first drum terminal.

In the third modification, the power supply voltage transmitted from the first main body terminal 64*a* is not directly supplied to the drum memory 81*a*. The drum memory 81*a* is driven by obtaining a voltage from the data signal and the synchronization signal which are supplied from the second main body terminal 65*a* through the second toner terminal 73*a*, the second toner relay terminal 77*a*, and the second drum terminal 83*a*.

Similarly, the drum memory 81*b* is driven by obtaining a voltage from the data signal and the synchronization signal which are supplied from the second main body terminal 65*b* through the second toner terminal 73*b*, the second toner relay terminal 77*b*, and the second drum terminal 83*b*. The drum memory 81*c* is driven by obtaining a voltage from the data signal and the synchronization signal which are supplied from the second main body terminal 65*c* through the second toner terminal 73*c*, the second toner relay terminal 77*c*, and the second drum terminal 83*c*. The drum memory 81*d* is driven by obtaining a voltage from the data signal and the synchronization signal which are supplied from the second main body terminal 65*d* through the second toner terminal 73*d*, the second toner relay terminal 77*d*, and the second drum terminal 83*d*.

Thus, the first drum terminal can be eliminated from each of the drum substrates 80*a*, 80*b*, 80*c*, and 80*d*. Therefore, the number of terminals of each of the drum substrates 80*a*, 80*b*, 80*c*, and 80*d* can be further reduced.

Similarly, the number of terminals can also be reduced in each of the toner substrates 70*a*, 70*b*, 70*c*, and 70*d*. For example, in a configuration of the first embodiment, each of the toner memories 71*a*, 71*b*, 71*c*, and 71*d* may be driven by obtaining a voltage from the data signal and the synchronization signal which are supplied through a respective one of the second toner terminals 73*a*, 73*b*, 73*c*, and 73*d*. As a result, a first toner terminal can be eliminated from each of the toner substrates 70*a*, 70*b*, 70*c*, and 70*d*.

<3-4. Fourth Modification>

Figure 8:
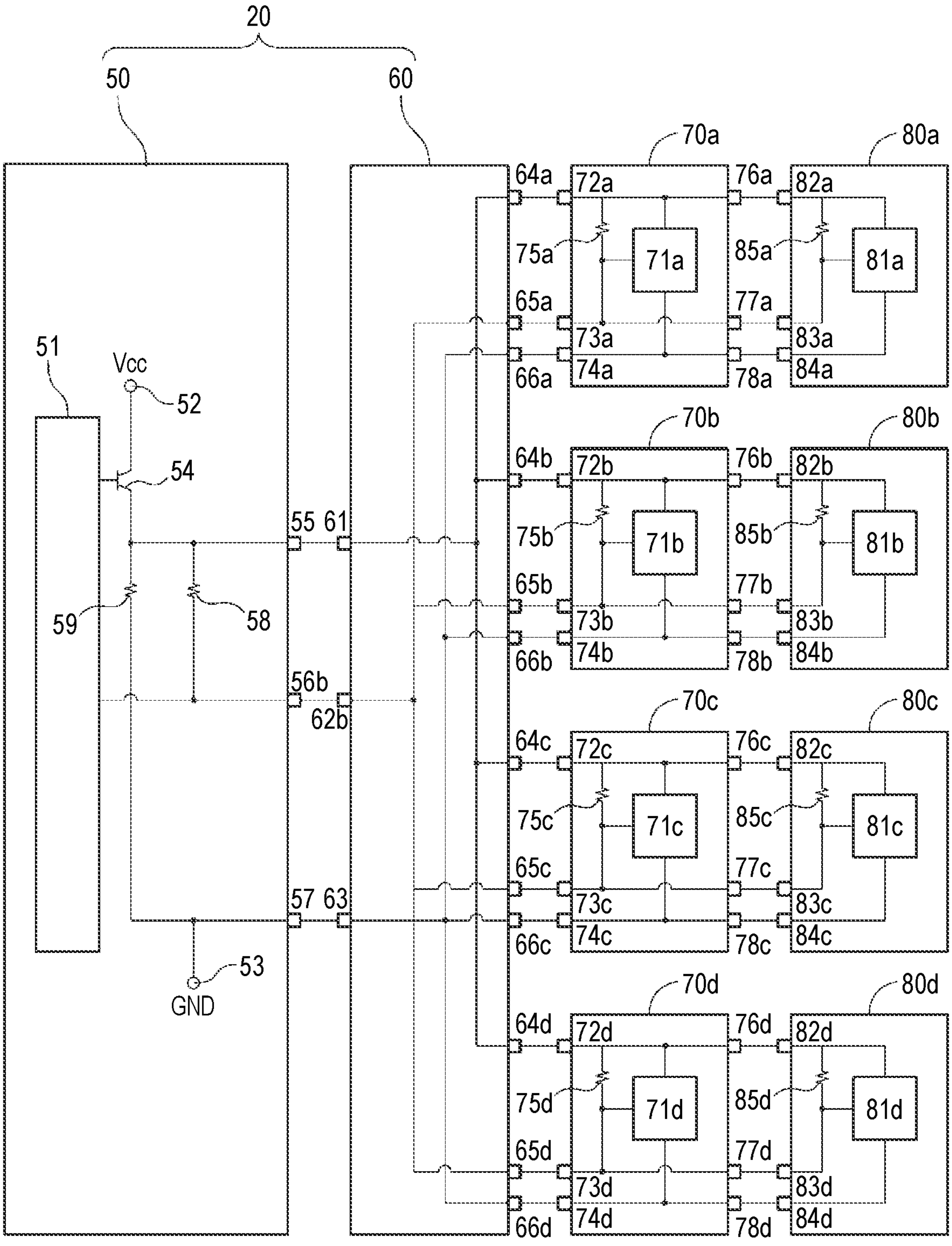
FIG. 8 is a block diagram showing electrical connection among the main body electrical substrate, the four toner substrates, and the four drum substrates.

FIG. 8 is a block diagram showing electrical connection among the main body electrical substrate 20, the four toner substrates 70*a*, 70*b*, 70*c*, and 70*d*, and the four drum substrates 80*a*, 80*b*, 80*c*, and 80*d* in a fourth modification. The fourth modification is different from the second embodiment in that the number of second main terminals 56 included in the main substrate 50 is one and that the number of second relay terminals 62 included in the relay substrate 60 is one.

In the main substrate 50 in FIG. 8, one second main terminal 56 is electrically connected to the processor 51. In the relay substrate 60 in FIG. 8, the four second main body terminals 65*a*, 65*b*, 65*c*, and 65*d* are electrically connected to one second relay terminal 62. The second main terminal 56 and the second relay terminal 62 are electrically connected to each other.

In the fourth modification, an address signal is included in a data signal transmitted from the processor 51 to the second main terminal 56. The address signal is a signal for designating which memory of the four toner memories 71*a*, 71*b*, 71*c*, and 71*d*, and the four drum memories 81*a*, 81*b*, 81*c*, and 81*d* is a transmission destination. When the data signal is output from the processor 51, only a memory designated by the address signal among the four toner memories 71*a*, 71*b*, 71*c*, and 71*d*, and the four drum memories 81*a*, 81*b*, 81*c*, and 81*d* receives the data signal.

Thus, the number of second main terminals of the main substrate 50 can be reduced. Further, the number of second relay terminals of the relay substrate 60 can also be reduced. Therefore, the number of terminals in the main body electrical substrate 20 can be further reduced.

However, in the fourth modification, different data signals cannot be simultaneously transmitted from the processor 51 to two or more memories. In contrast, in configurations of the first embodiment, the second embodiment, the first modification, the second modification, and the third modification, different data signals can be simultaneously transmitted from the processor 51 to a plurality of memories. Therefore, when a communication speed with memories is emphasized, it is preferable to adopt the configuration of the first embodiment, the second embodiment, the first modification, the second modification, or the third modification.

<3-5. Fifth Modification>

In the above embodiments, the toner memories 71*a*, 71*b*, 71*c*, and 71*d*, and the drum memories 81*a*, 81*b*, 81*c*, and 81*d* each include the timer that generates the clock signal. The synchronization signals transmitted from the main body electrical substrate 20 to the memories 71*a*, 71*b*, 71*c*, 71*d*, 81*a*, 81*b*, 81*c*, and 81*d* are each the reset signal for resetting the timer.

However, each of the toner memories 71*a*, 71*b*, 71*c*, and 71*d*, and the drum memories 81*a*, 81*b*, 81*c*, and 81*d* may not include the timer that generates the clock signal. In this case, synchronization signals transmitted from the main body electrical substrate 20 to the memories 71*a*, 71*b*, 71*c*, 71*d*, 81*a*, 81*b*, 81*c*, and 81*d* may be clock signals.

<3-6. Sixth Modification>

In the above embodiments, first main body terminals of a main body electrical substrate are each the terminal that transmits the power supply voltage, and second main body terminals of the main body electrical substrate are each the terminal that transmits the synchronization signal and the data signal. However, each of the first main body terminals of the main body electrical substrate may be a terminal that transmits a clock signal which is a synchronization signal, and each of the second main body terminals of the main body electrical substrate may be a terminal that transmits a data signal.

In this case, each toner memory receives the clock signal through a respective one of first toner terminals and receives the data signal through a respective one of second toner terminals. At this time, each toner memory may be driven by obtaining a voltage from a respective one of these clock signals or data signals. Each drum memory receives the clock signal through a respective one of first drum terminals and receives the data signal through a respective one of second drum terminals. At this time, each drum memory may be driven by obtaining a voltage from a respective one of these clock signals or data signals.

That is, the first main body terminal of the main body electrical substrate may substantially transmit the power supply voltage and the clock signal. The second main body terminal of the main body electrical substrate may substantially transmit the power supply voltage and the data signal.

<3-7. Seventh Modification>

Figure 9:
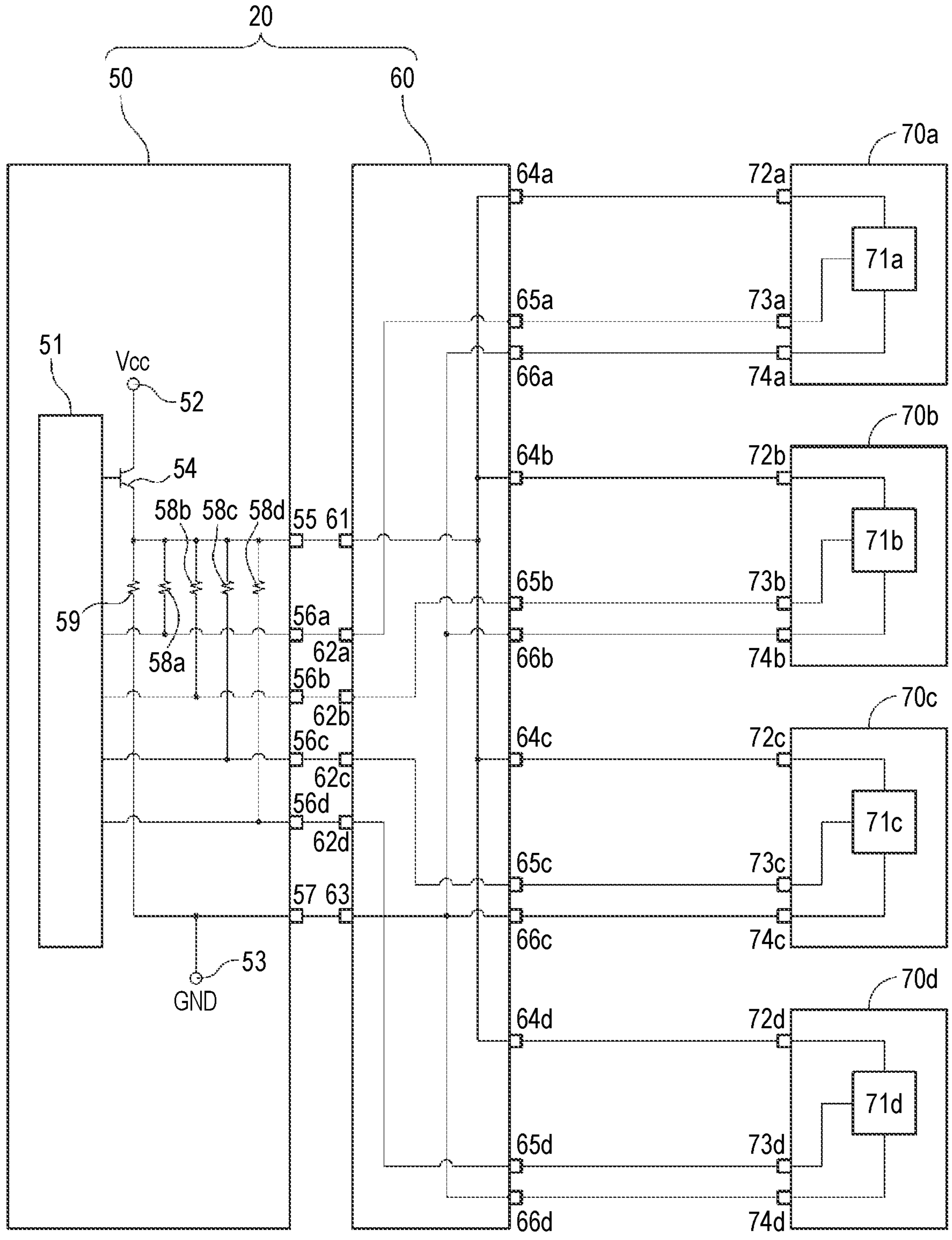
FIG. 9 is a block diagram showing electrical connection between the main body electrical substrate and each of the four toner substrates.

FIG. 9 is a block diagram showing electrical connection between the main body electrical substrate 20 and each of the four toner substrates 70*a*, 70*b*, 70*c*, and 70*d* in a seventh modification. The seventh modification is different from the first embodiment in that each of the toner substrates 70*a*, 70*b*, 70*c*, and 70*d* does not include the toner pull-up resistor.

The second main body terminal 65*a* of the main body electrical substrate 20 is electrically connected to the second toner terminal 73*a* of the toner substrate 70*a*. Therefore, when the main body electrical substrate 20 is provided with the main body pull-up resistor 58*a*, an influence of the noise on the data signal and the synchronization signal transmitted between the main body electrical substrate 20 and the toner substrate 70*a* can be reduced to some extent even if the toner substrate 70*a* is not provided with the toner pull-up resistor. Similarly, the second main body terminal 65*b* of the main body electrical substrate 20 is electrically connected to the second toner terminal 73*b* of the toner substrate 70*b*. Therefore, when the main body electrical substrate 20 is provided with the main body pull-up resistor 58*b*, an influence of the noise on the data signal and the synchronization signal transmitted between the main body electrical substrate 20 and the toner substrate 70*b* can be reduced to some extent even if the toner substrate 70*b* is not provided with the toner pull-up resistor.

The second main body terminal 65*c* of the main body electrical substrate 20 is electrically connected to the second toner terminal 73*c* of the toner substrate 70*c*. Therefore, when the main body electrical substrate 20 is provided with the main body pull-up resistor 58*c*, an influence of the noise on the data signal and the synchronization signal transmitted between the main body electrical substrate 20 and the toner substrate 70*c* can be reduced to some extent even if the toner substrate 70*c* is not provided with the toner pull-up resistor. Similarly, the second main body terminal 65*d* of the main body electrical substrate 20 is electrically connected to the second toner terminal 73*d* of the toner substrate 70*d*. Therefore, when the main body electrical substrate 20 is provided with the main body pull-up resistor 58*d*, an influence of the noise on the data signal and the synchronization signal transmitted between the main body electrical substrate 20 and the toner substrate 70*d* can be reduced to some extent even if the toner substrate 70*d* is not provided with the toner pull-up resistor.

<3-8. Eighth Modification>

Figure 10:
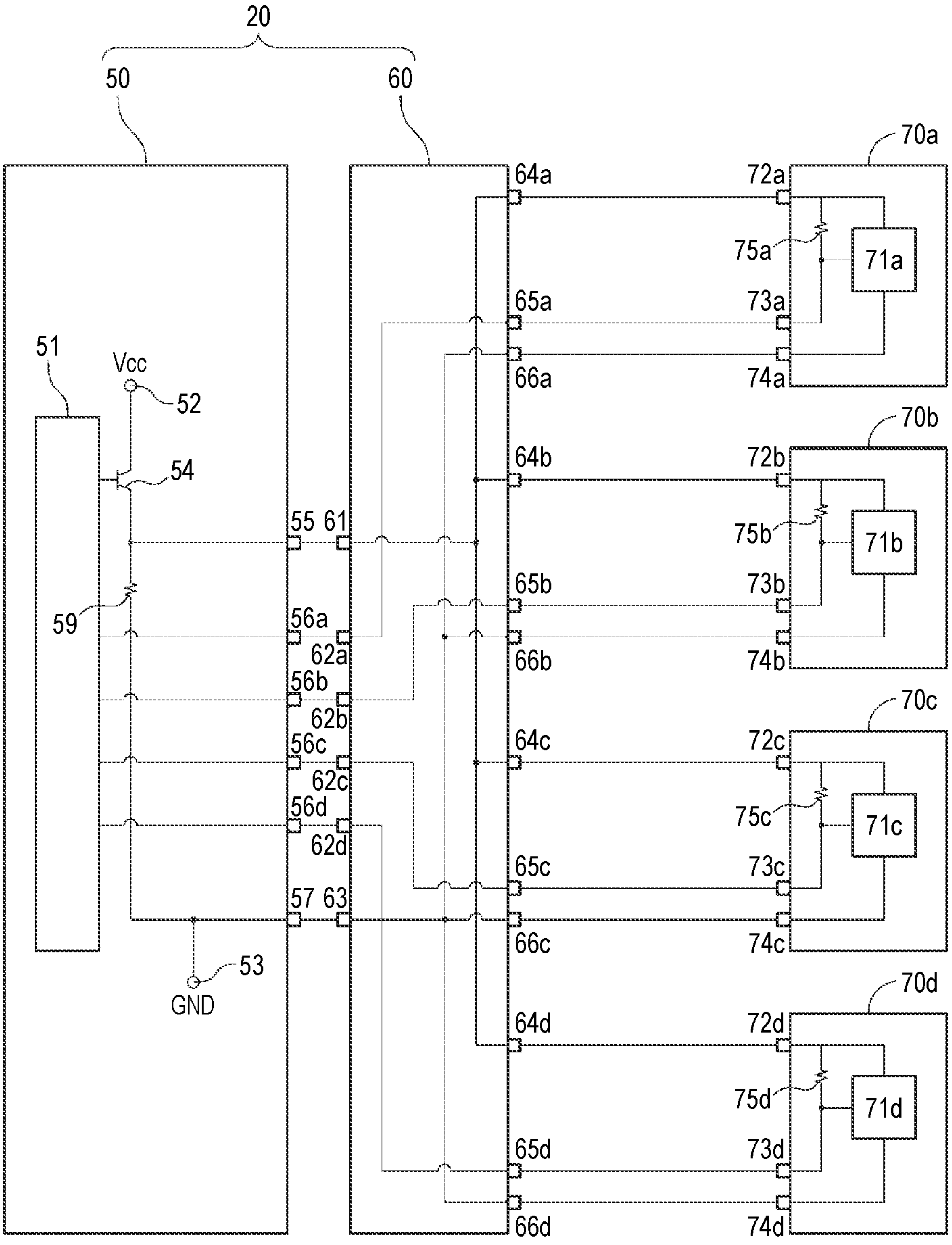
FIG. 10 is a block diagram showing electrical connection between the main body electrical substrate and each of the four toner substrates.

FIG. 10 is a block diagram showing electrical connection between the main body electrical substrate 20 and each of the four toner substrates 70*a*, 70*b*, 70*c*, and 70*d* in an eighth modification. The eighth modification is different from the first embodiment in that the main body electrical substrate 20 does not include a main body pull-up resistor.

The second main body terminal 65*a* of the main body electrical substrate 20 is electrically connected to the second toner terminal 73*a* of the toner substrate 70*a*. Therefore, when the toner substrate 70*a* is provided with the toner pull-up resistor 75*a*, an influence of the noise on the data signal and the synchronization signal transmitted between the main body electrical substrate 20 and the toner substrate 70*a* can be reduced to some extent even if the main body electrical substrate 20 is not provided with the main body pull-up resistor. Similarly, the second main body terminal 65*b* of the main body electrical substrate 20 is electrically connected to the second toner terminal 73*b* of the toner substrate 70*b*. Therefore, when the toner substrate 70*b* is provided with the toner pull-up resistor 75*b*, an influence of the noise on the data signal and the synchronization signal transmitted between the main body electrical substrate 20 and the toner substrate 70*b* can be reduced to some extent even if the main body electrical substrate 20 is not provided with the main body pull-up resistor.

The second main body terminal 65*c* of the main body electrical substrate 20 is electrically connected to the second toner terminal 73*c* of the toner substrate 70*c*. Therefore, when the toner substrate 70*c* is provided with the toner pull-up resistor 75*c*, an influence of the noise on the data signal and the synchronization signal transmitted between the main body electrical substrate 20 and the toner substrate 70*c* can be reduced to some extent even if the main body electrical substrate 20 is not provided with the main body pull-up resistor. Similarly, the second main body terminal 65*d* of the main body electrical substrate 20 is electrically connected to the second toner terminal 73*d* of the toner substrate 70*d*. Therefore, when the toner substrate 70*d* is provided with the toner pull-up resistor 75*d*, an influence of the noise on the data signal and the synchronization signal transmitted between the main body electrical substrate 20 and the toner substrate 70*d* can be reduced to some extent even if the main body electrical substrate 20 is not provided with the main body pull-up resistor.

<3-9. Other Modifications>

In the above embodiments, four drum cartridges and four toner cartridges can be attached to an image forming apparatus. However, the number of drum cartridges and the number of toner cartridges that can be attached to the image forming apparatus each may be one, two, or three, or may be five or more.

In the above embodiments, one toner cartridge is attached to one drum cartridge. However, a plurality of toner cartridges may be attached to one drum cartridge.

Further, in the above embodiments, the toner cartridge includes a developing roller. However, the toner cartridge may not include the developing roller, and the drum cartridge may include the developing roller.

In the above embodiments, the toner cartridges and the drum cartridges are shown as examples of the "cartridge". However, the "cartridge" may be an ink cartridge or a tape cassette that can be attached to the image forming apparatus.

Structures and circuit configurations in the above embodiments and modifications are merely examples. Various elements described in the above embodiments may be replaced with other known elements within a range not departing from the spirit of the present disclosure. In addition, the various elements described in the above embodiments may be appropriately combined unless any contradiction arises.

What is claimed is:

1. An image forming apparatus to which a cartridge that includes a cartridge substrate including a memory is attachable, the image forming apparatus comprising:

a main body electrical substrate;

a main body ground terminal electrically connected to the main body electrical substrate, the main body ground terminal being configured to take a ground voltage;

a first main body terminal electrically connected to the main body electrical substrate, the first main body terminal being configured to transmit one of a power supply voltage higher than the ground voltage, a data signal that indicates information written into the memory or read out from the memory, and a synchronization signal taking a timing of the data signal;

a second main body terminal electrically connected to the main body electrical substrate, the second main body terminal being configured to transmit remaining two of the power supply voltage, the data signal, and the synchronization signal; and a main body frame to which the cartridge is attachable, wherein the cartridge substrate includes:

a cartridge ground terminal electrically connected to the main body ground terminal in a state where the cartridge is attached to the main body frame;

a first cartridge terminal electrically connected to the first main body terminal in the state; and a second cartridge terminal electrically connected to the second main body terminal in the state, wherein the memory includes a timer configured to generate a clock signal, and wherein the synchronization signal is a reset signal for resetting the timer.

2. The image forming apparatus according to claim 1, wherein the synchronization signal is a clock signal.

3. The image forming apparatus according to claim 1, wherein the first main body terminal is configured to transmit the power supply voltage, and the second main body terminal is configured to transmit the data signal and the synchronization signal.

4. The image forming apparatus according to claim 1, wherein the cartridge substrate further includes:

a cartridge pull-up resistor including one end connected to the first cartridge terminal and the other end connected to the second cartridge terminal.

5. The image forming apparatus according to claim 1, wherein the main body electrical substrate includes:

a main body pull-up resistor including one end connected to the first main body terminal and the other end connected to the second main body terminal.

6. The image forming apparatus according to claim 1, wherein the main body electrical substrate includes:

a switch configured to switch between supply and stop of the power supply voltage to the first main body terminal; and a processor configured to control the switch.

7. The image forming apparatus according to claim 1, wherein the main body electrical substrate further includes:

a main body pull-down resistor that includes one end connected to the first main body terminal and the other end connected to the main body ground terminal.

8. The image forming apparatus according to claim 1, wherein the memory is configured to be driven by obtaining a voltage from a signal supplied from the second cartridge terminal.

9. The image forming apparatus according to claim 1, wherein the cartridge includes:

a toner cartridge including a toner substrate being the cartridge substrate; and a drum cartridge including a photosensitive drum, the drum cartridge including a drum substrate, wherein the drum substrate is electrically connected to the main body electrical substrate through the toner substrate.

10. The image forming apparatus according to claim 9, wherein the toner cartridge includes a developing roller.

11. The image forming apparatus according to claim 1, wherein the main body electrical substrate includes:

a main substrate including a processor; and a relay substrate configured to relay connection between the main substrate and the cartridge substrate.

12. The image forming apparatus according to claim 1, wherein the memory is configured to store the information used by the image forming apparatus.

13. The image forming apparatus according to claim 1, wherein the information includes at least one of identification information and lifetime information of the cartridge, and the main body electrical substrate is configured to read out the information as the data signal from the memory, and to store the information in a main body memory mounted on the main body electrical substrate.

14. An image forming apparatus to which a cartridge that includes a cartridge substrate including a memory is attachable, the image forming apparatus comprising:

a main body electrical substrate;

a main body ground terminal electrically connected to the main body electrical substrate, the main body ground terminal being configured to take a ground voltage;

a first main body terminal electrically connected to the main body electrical substrate, the first main body terminal being configured to transmit one of a power supply voltage higher than the ground voltage, a data signal that indicates information written into the memory or read out from the memory, and a synchronization signal taking a timing of he data signal;

a second main body terminal electrically connected to the main body electrical substrate, the second main body terminal being configured to transmit remaining two of the power supply voltage, the data signal, and the synchronization signal; and a main body frame to which the cartridge is attachable, wherein the cartridge substrate includes:

a cartridge ground terminal electrically connected to the main body ground terminal in a state where the cartridge is attached to the main body frame;

a first cartridge terminal electrically connected to the first main body terminal in the state; and a second cartridge terminal electrically connected to the second main body terminal in the state, wherein the first main body terminal is configured to transmit a clock signal being the synchronization signal, and wherein the second main body terminal is configured to transmit the data signal.

15. The image forming apparatus according to claim 14, wherein the memory is configured to be driven by obtaining a voltage from a signal supplied from the first cartridge terminal or the second cartridge terminal.

16. The image forming apparatus according to claim 14, wherein the cartridge includes:

a toner cartridge including a toner substrate being the cartridge substrate; and a drum cartridge including a photosensitive drum, the drum cartridge including a drum substrate, wherein the drum substrate is electrically connected to the main body electrical substrate through the toner substrate.

17. The image forming apparatus according to claim 16, wherein the toner cartridge includes a developing roller.

18. The image forming apparatus according to claims 14, wherein the main body electrical substrate includes:

a main substrate including a processor; and a relay substrate configured to relay connection between the main substrate and the cartridge substrate.

19. The image forming apparatus according to claim 14, wherein the memory is configured to store the information used by the image forming apparatus.

20. The image forming apparatus according to claim 14, wherein the information includes at least one of identification information and lifetime information of the cartridge, and the main body electrical substrate is configured to read out the information as the data signal from the memory, and to store the information in a main body memory mounted on the main body electrical substrate.

* * * * *